United States Patent [19]
Wellman et al.

[11] Patent Number: 5,258,911
[45] Date of Patent: Nov. 2, 1993

[54] END OF AISLE CONTROL SYSTEM

[75] Inventors: Timothy A. Wellman, Coldwater; Harold A. Stammen, New Bremen; Thomas W. Heindel, Mendon, all of Ohio

[73] Assignee: Crown Equipment Corporation, New Bremen, Ohio

[21] Appl. No.: 763,821

[22] Filed: Sep. 23, 1991

Related U.S. Application Data

[63] Continuation-in-part of Ser. No. 682,832, Apr. 9, 1991, abandoned.

[51] Int. Cl.⁵ .............................................. G06F 15/50
[52] U.S. Cl. ........................... 364/424.01; 364/424.02; 318/587; 180/167; 180/169
[58] Field of Search ....................... 364/424.01, 424.02; 318/587; 180/167, 168, 169

[56] References Cited

U.S. PATENT DOCUMENTS

| | | | |
|---|---|---|---|
| 4,284,160 | 8/1981 | Deliban et al. | 318/587 |
| 4,379,497 | 4/1983 | Hainsworth et al. | 180/168 |
| 4,401,181 | 8/1983 | Schwarz | 180/168 |
| 4,437,533 | 3/1984 | Bierkarre et al. | 180/168 |
| 4,465,155 | 8/1984 | Collins | 180/169 |
| 4,530,056 | 7/1985 | MacKinnon et al. | 318/587 |
| 4,716,530 | 12/1987 | Ogawa et al. | 318/587 |
| 4,866,617 | 9/1989 | Matsuda et al. | 180/169 |
| 4,982,329 | 1/1991 | Tabata et al. | 364/424.02 |
| 4,990,841 | 2/1991 | Elder | 364/424.02 |
| 5,036,935 | 8/1991 | Kohara | 364/424.02 |

Primary Examiner—Gary Chin
Attorney, Agent, or Firm—Biebel & French

[57] ABSTRACT

An end of aisle control system permits an operator controlled materials handling vehicle to be configured by following instructions given on a service terminal and easily positionable magnet sensors to a customer's specific operating environment. In addition to end of aisle magnets that are buried in specified paths in the floor of a warehouse, magnets may be buried in other paths to accomplish specified functions, such as auto-resume and end aisle blocked. The buried magnets identify zones of operation and a microprocessor controls the maximum speed of travel in each of these zones. The maximum speed of the vehicle in each of the specified zones may be pre-selected according to the direction of travel of the vehicle, thus making the control system adaptable to a wide variety of operating environments. The end of aisle control system also controls the method of stopping the vehicle, either by the use of brakes, or by plugging the traction motor. Whenever the vehicle is stopped in response to action by the end of aisle control system, an audible and visual signal is presented, indicating that specific operator action is required before further movement in that same direction is possible.

37 Claims, 27 Drawing Sheets

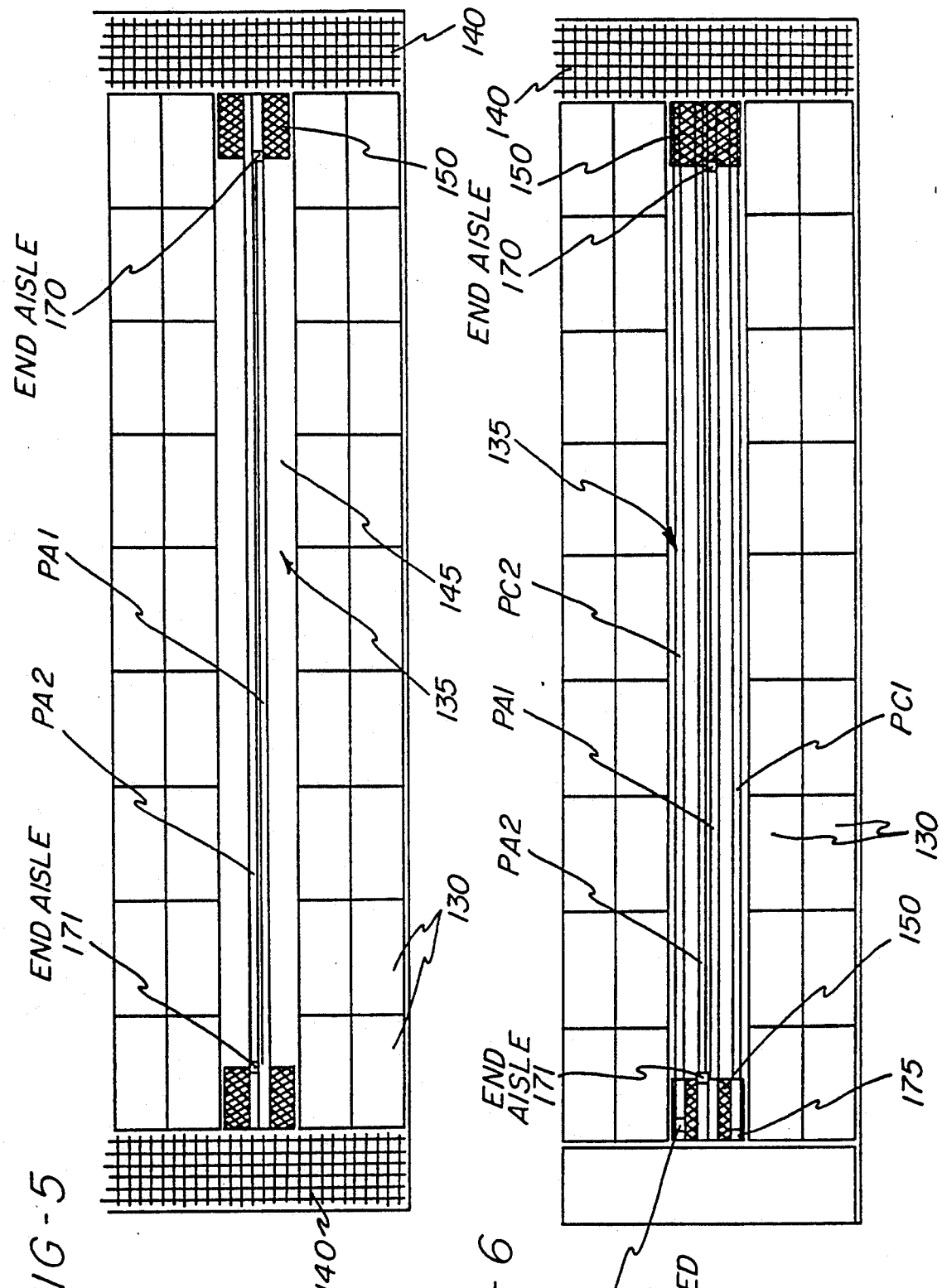

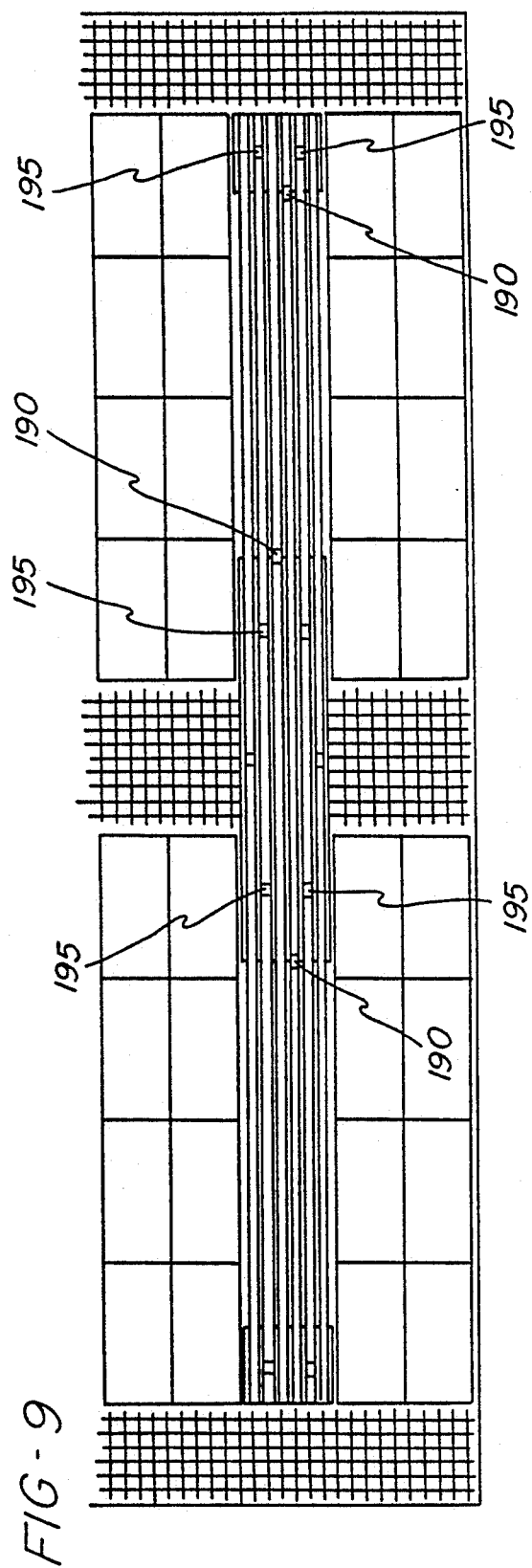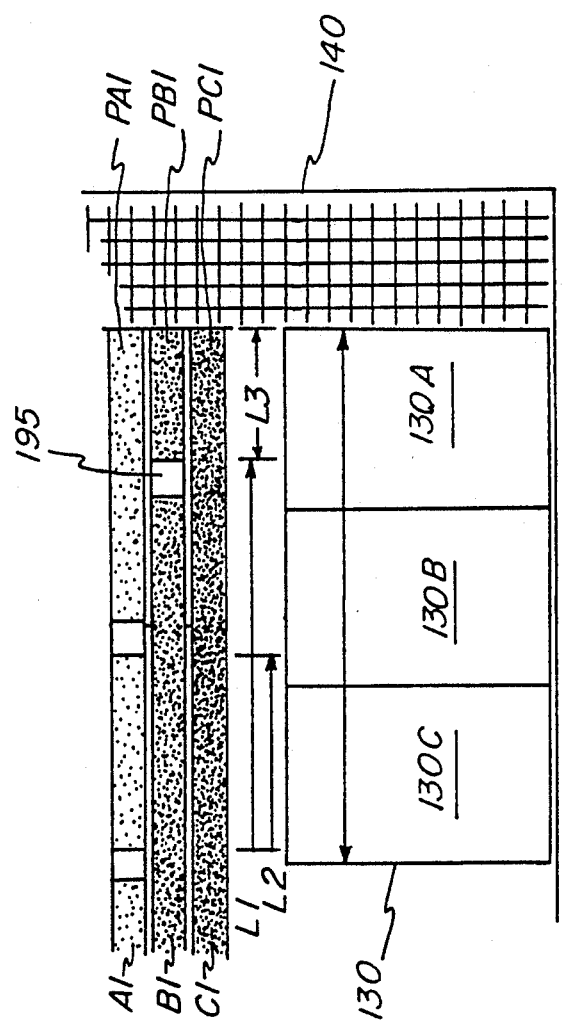
FIG-9
FIG-10

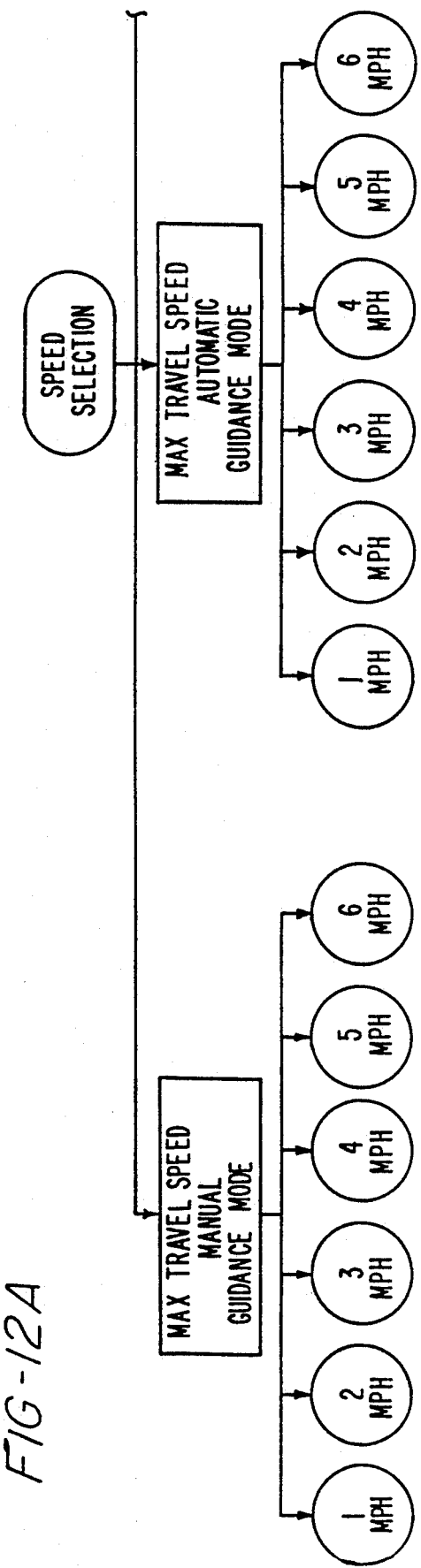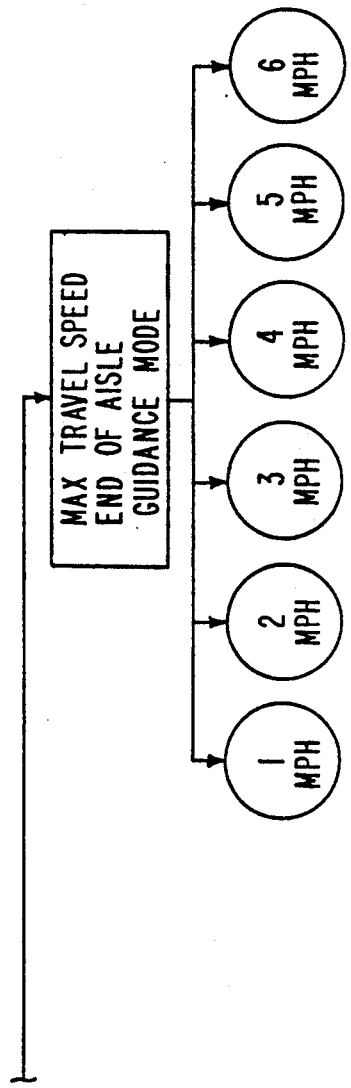
FIG-12A
FIG-12B

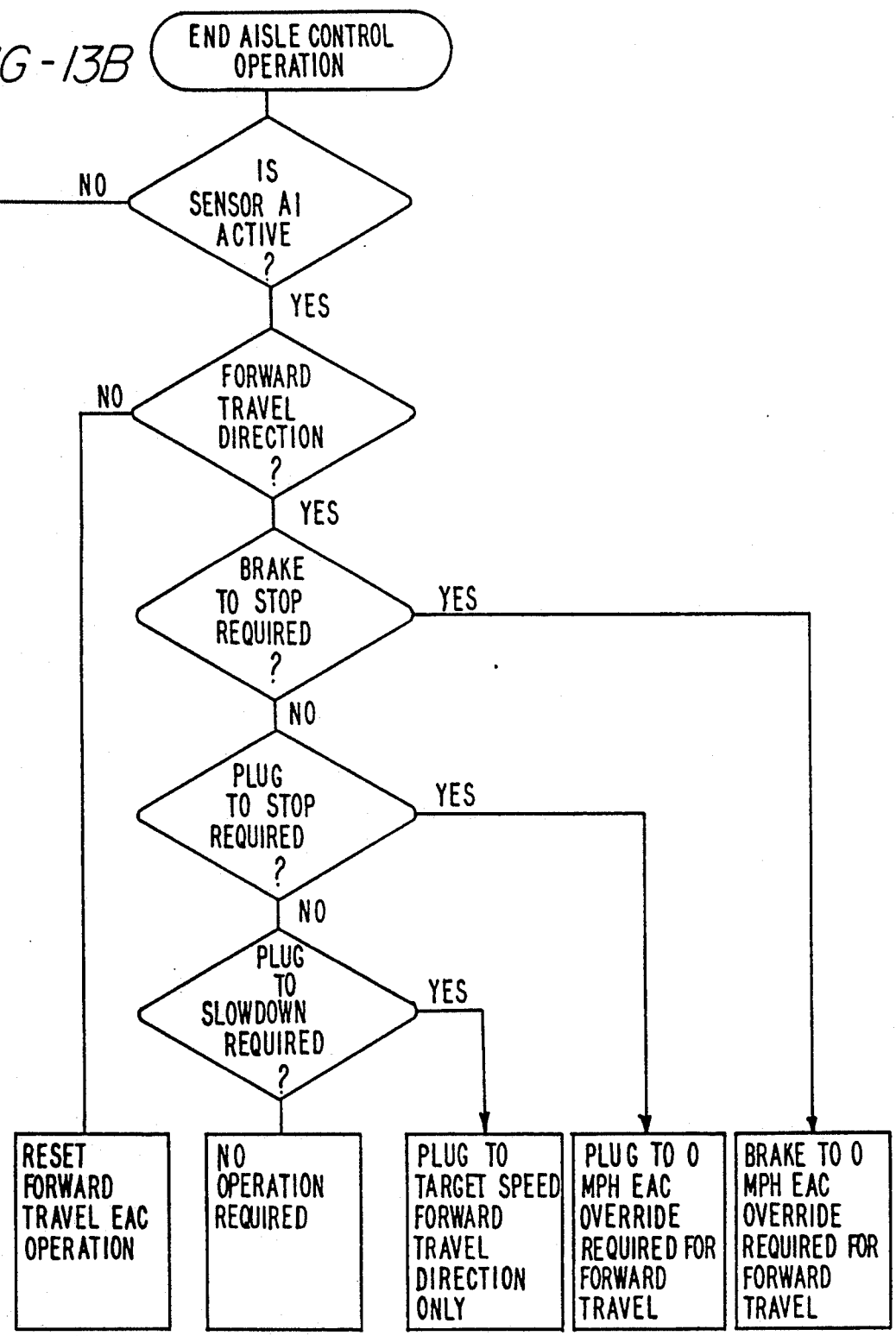

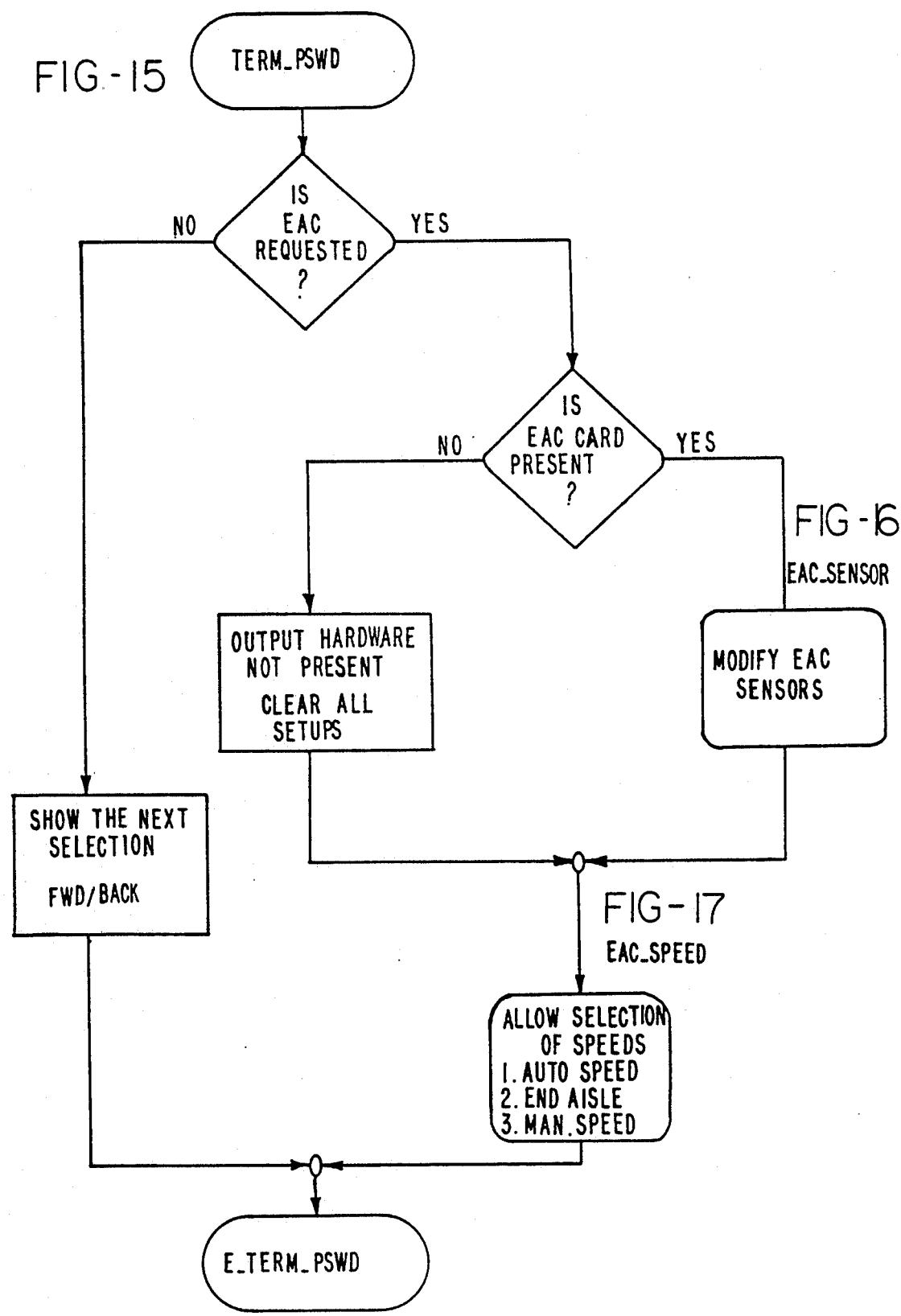

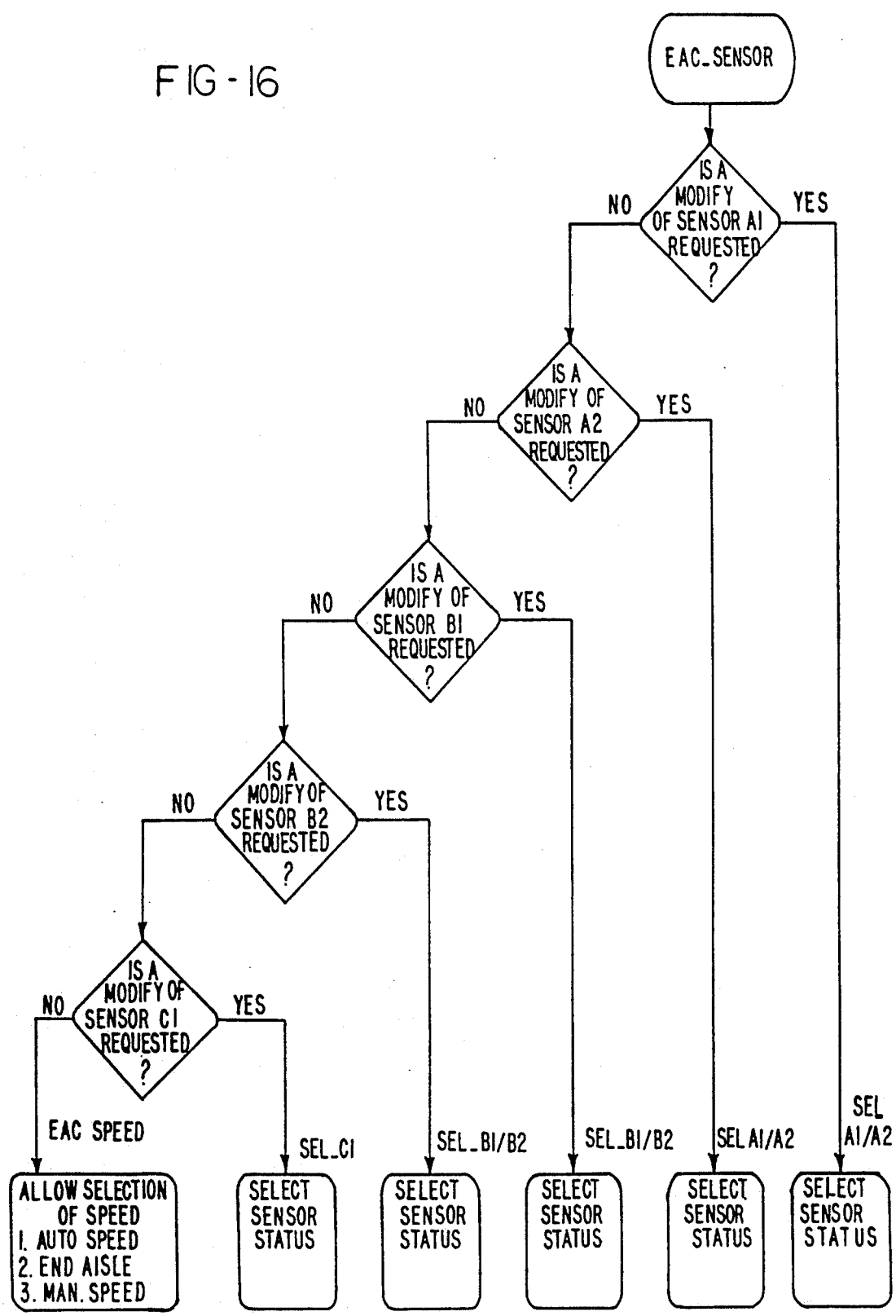

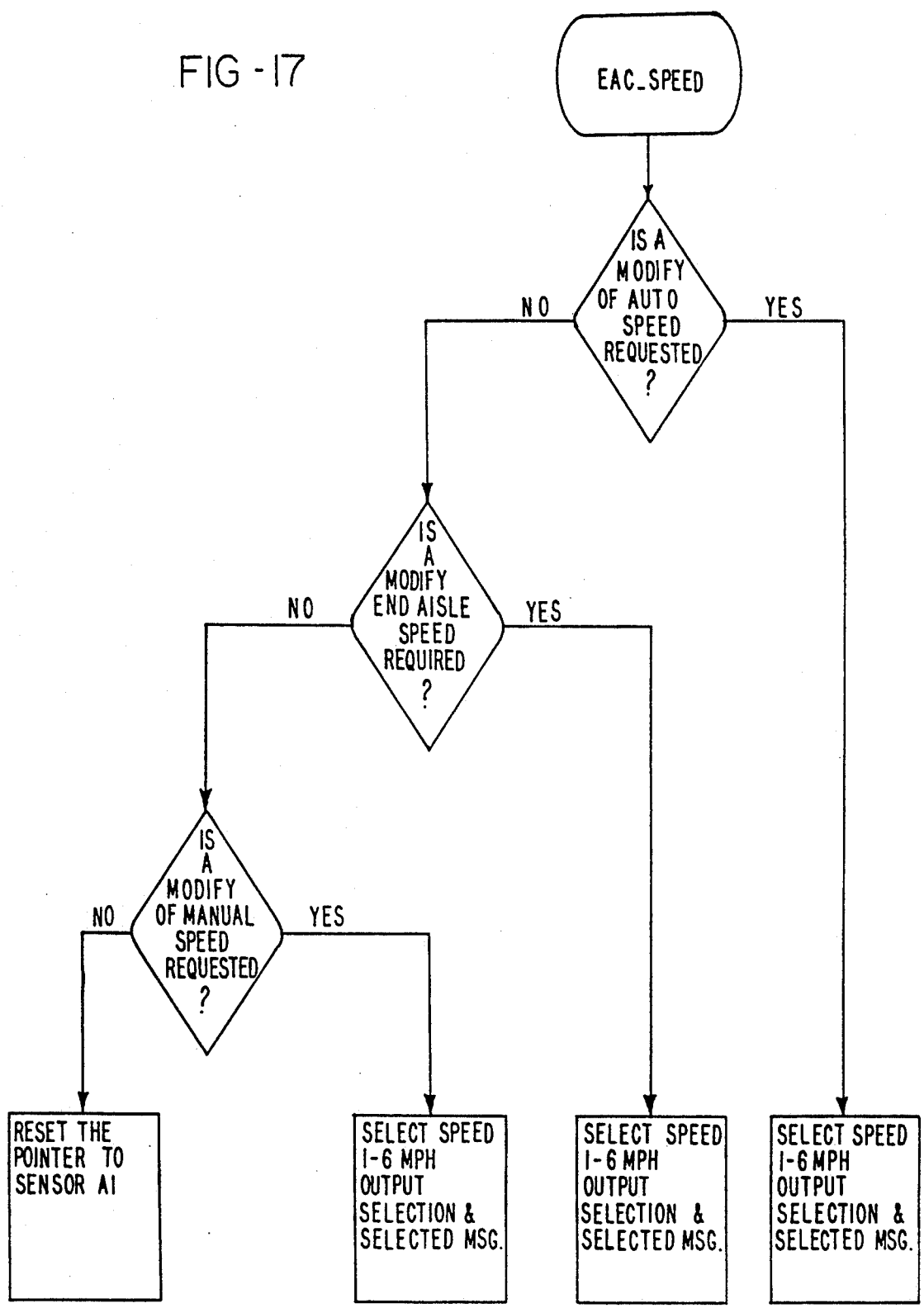

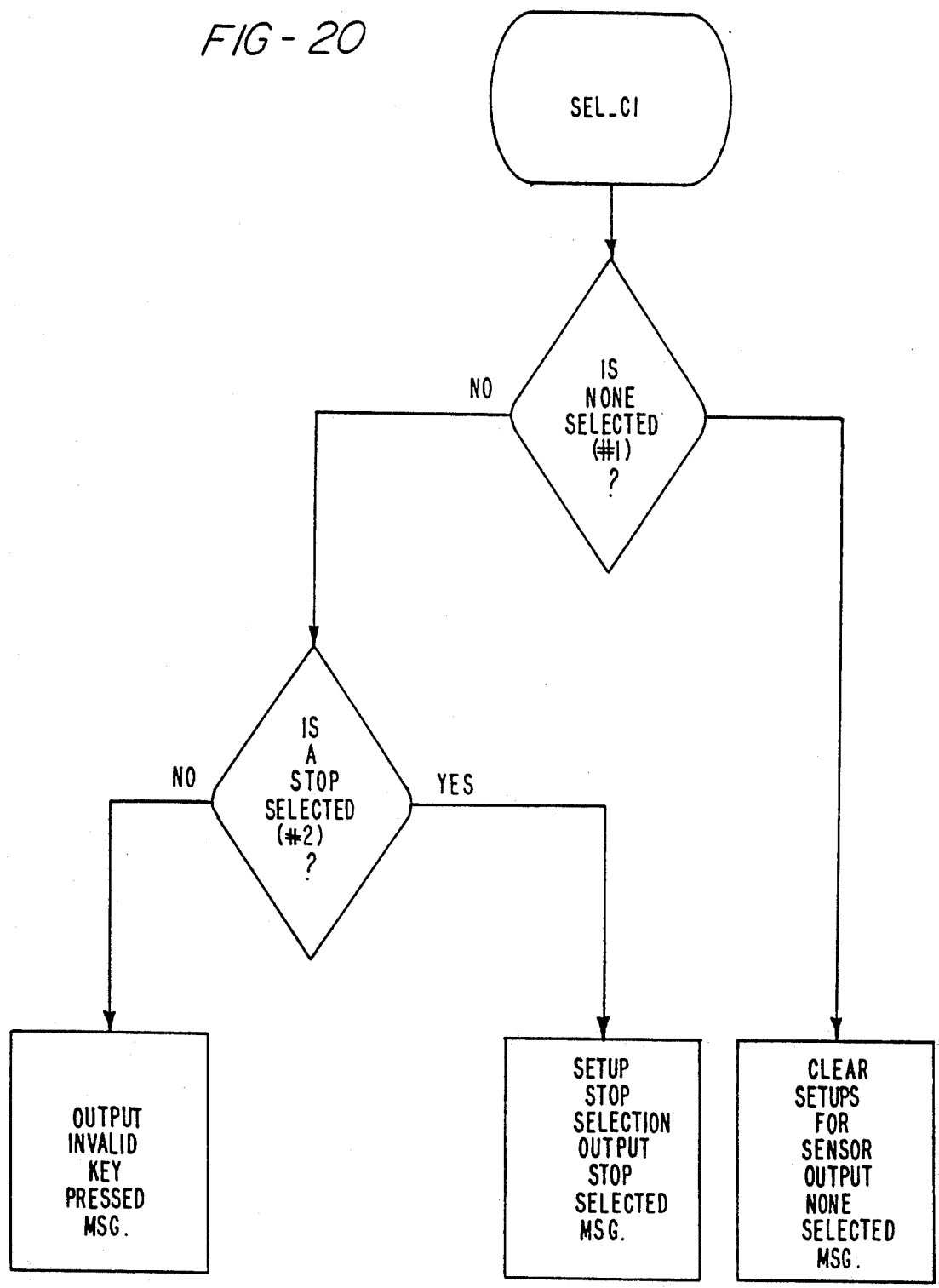

FIG-21

| E | N | D | | A | I | S | L | E | | C | O | N | T | R | O | L | | | |
| M | O | D | I | F | Y | ? | | Y | E | S | | O | R | | F | W | D | / | B | A | C | K | | □ |

TOP LEVEL MESSAGE

FIG-22

| E | A | C | | H | A | R | D | W | A | R | E | | N | O | T | | P | R | E | S | E | N | T | |
| P | R | E | S | S | | F | W | D | / | B | A | C | K | | O | R | | A | B | O | R | T | | □ |

THIS MESSAGE APPEARS IF EAC CARD IS NOT INSTALLED IN COMPUTER

FIG-23

| P | R | E | S | S | | A | B | O | R | T | | T | O | | L | E | A | V | E | | E | A | C |
| F | W | D | / | B | A | C | K | | F | O | R | | N | E | X | T | | I | T | E | M | | □ |

THIS MESSAGE APPEARS WHEN THE "ABORT" KEY IS PRESSED

FIG-24

| S | E | N | S | O | R | | A | 1 | | S | E | T | | T | O | | ▓ | ▓ | ▓ | ▓ | ▓ | ▓ | |
| M | O | D | I | F | Y | ? | | Y | E | S | | O | R | | F | W | D | / | B | A | C | K | | □ |

▓ SETS "A1" SENSOR NONE, BRAKE, SCR=0 OR SCR>0

FIG-25

| S | E | N | S | O | R | | A | 2 | | S | E | T | | T | O | | ▓ | ▓ | ▓ | ▓ | ▓ | ▓ | |
| M | O | D | I | F | Y | ? | | Y | E | S | | O | R | | F | W | D | / | B | A | C | K | | □ |

▓ SET "A2" SENSOR NONE, BRAKE, SCR=0 OR SCR>0

FIG-26 SENSOR B1 SET TO ▒▒▒▒▒
MODIFY? YES OR FWD/BACK

▒ SETS "B1" SENSOR NONE OR RESUME

FIG-27 SENSOR B2 SET TO ▒▒▒▒▒
MODIFY? YES OR FWD/BACK

▒ SETS B2 SENSOR NONE OR RESUME

FIG-28 SENSOR C1 SET TO ▒▒▒▒
MODIFY? YES OR FWD/BACK

▒ SETS C1 SENSOR NONE OR STOP

FIG-29 ▒ MPH MANUAL GUIDE SPEED
MODIFY? YES OR FWD/BACK

▒ SETS SPEED TO A VALUE FROM 1 THRU 6

FIG-30 ▒ MPH AUTO GUIDE SPEED
MODIFY? YES OR FWD/BACK

▒ SETS SPEED TO A VALUE FROM 1 THRU 6

FIG-31 ▒ MPH END OF AISLE SPEED
MODIFY? YES OR FWD/BACK

▒ SETS SPEED TO A VALUE FROM 1 THRU 6

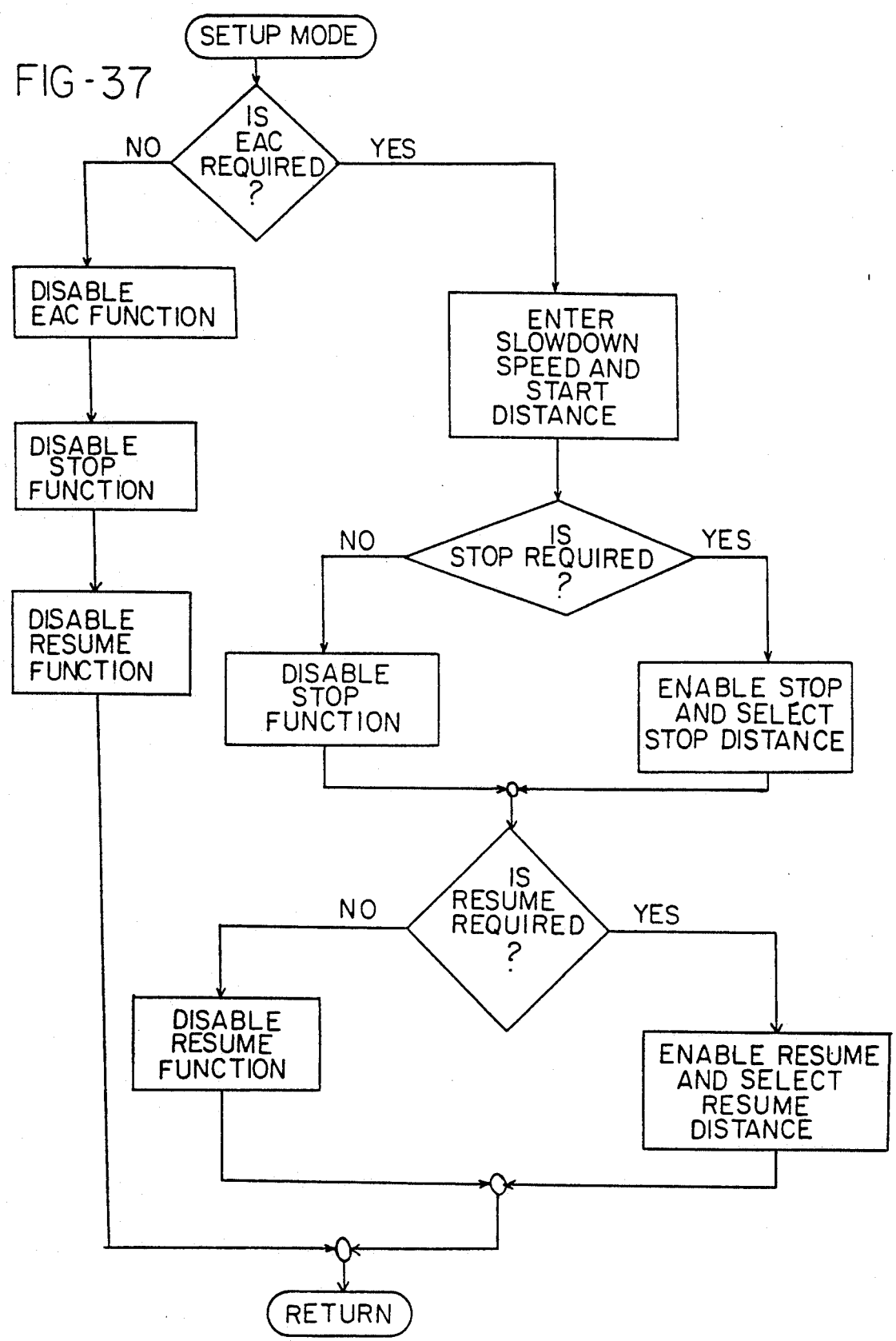

END OF AISLE CONTROL SYSTEM

RELATED APPLICATION

This application is a continuation-in-part of application Ser. No. 07/682,832, filed Apr. 9, 1991 now abandoned and assigned to the same assignee as the present invention.

BACKGROUND OF THE INVENTION

This invention relates to an end of aisle control system of the type employed by operator controlled materials handling vehicles.

End of aisle control systems are designed to warn an operator or stop a vehicle when the vehicle is about to exit an aisle, that is, the space between storage racks in which the vehicle is operating. In modern warehouses, the aisles are narrow, so narrow that special guidance systems are used to steer the vehicle. One guidance system uses rail on the racks to engage guiding wheels mounted on the sides of the vehicle. Because the aisles are so narrow, the operator's view of an intersecting aisle is limited, especially when operating in the reverse direction. An end of aisle control system is therefore employed to provide the necessary warning to the operator or to slow or stop the vehicle prior to its entering the intersection or exiting an aisle.

Various techniques for providing end of aisle control have been provided, such as the use of reflective tape and floor mounted magnets. Magnets buried in the floor are preferred since they are not as prone to damage or subject to tampering.

One problem noted with prior art systems has been in the abrupt braking often experience by the operator when the end of aisle control system is operational. Braking actions often take place at unexpected times since the operator may be unaware of how close to the aisle's end the vehicle is presently located. Accordingly, there is a need to alert the operator that the end of aisle zone has been entered and to slow the vehicle in an appropriate manner.

Another problem with prior art systems is found when moving from one aisle to another aisle directly across a wide intersection. If the vehicle is forced into a slow mode of travel after leaving an aisle, then the operator is required to continue in that slow mode until another end of aisle magnet is detected, indicating that a new aisle has been entered. It would be desirable to permit the vehicle to resume its normal speed automatically after the operator has exited an aisle a sufficient distance that a clear view of the intersection is possible.

SUMMARY OF THE INVENTION

In the present invention, an end of aisle control system is provided to permit an operator controlled materials handling vehicle to be configured by following simple instructions given on a service terminal and easily positionable magnet sensors to a customer's specific operating environment.

In addition to end of aisle magnets that are buried in specified paths in the floor of a warehouse, or other similar structure, the present invention uses magnets buried in additional paths to accomplish specified functions. The buried magnets identify zones of operation and a microprocessor controls the maximum speed of travel in each of these zones. In one embodiment of this invention, there are three primary zones, namely, a manually guided zone of operation, an auto-guided zone, and an end-of-aisle zone.

The maximum speed of the vehicle in each of the specified zones may be pre-selected according to the direction of travel of the vehicle, thus making the control system adaptable to a wide variety of operating environments.

The end of aisle control system also controls the vehicle as it transitions from one zone to another. For example, when entering an end of aisle zone, the vehicle may be slowed gently by using the traction motors as brakes, or in other words, it may be plugged to a specified slow down speed. The vehicle may also be brought to a complete stop either by plugging or through the use of the vehicle's mechanical brakes. When using mechanical brakes in the present invention, braking action may be accomplished according to speed in the manner described in the previously filed patent application Ser. No. 07/446,269, filed Dec. 5, 1989 and assigned to the same assignee as the present invention.

Whenever the vehicle is stopped in response to action by the end of aisle control system, an audible and visual signal is presented, indicating that specific operator action is required before further movement in that same direction is possible.

One magnet or set of magnets may be used to permit the vehicle to resume its previous auto-guided speed in an end of aisle zone while the vehicle moves from one aisle to another, thus saving the operator valuable time. Another magnet or set of magnets may be used to indicate that the aisle is blocked and that further travel in that direction is prohibited.

In another embodiment of the invention, a magnet is placed in the floor of the aisle and the distance the vehicle travels after passing the magnet is monitored. The speed of the vehicle is limited to a specified slow-down speed after it has traveled a predetermined distance (which could be zero) toward the nearest aisle end after detecting the presence of the magnet, and vehicle may be stopped or maximum vehicle speed again permitted after the vehicle has traveled a second predetermined distance. Two magnets may be used, and if the second magnet has not been detected within a predetermined distance after the detection of the first magnet, the vehicle will be braked to a stop. The speed of the vehicle is sensed when detecting a magnet, and then again after a specified distance. If the second speed is greater than a predetermined percentage of the original speed, then a fault is presumed to exist and the vehicle will be braked to a stop. An additional magnet may be provided to reset a distance counter and thereby extend the operation of the vehicle functions.

In the preferred embodiment of this invention, the vehicle operating parameters and control functions are entered into the vehicle's on-board computer via a service terminal.

It is therefore an object of this invention to provide an improved end of aisle control system that provides great flexibility in establishing operating zones, the speed of the vehicle in those zones, and the manner in which the vehicle is slowed or stopped when transitioning from a higher speed zone to a slower speed zone.

It is a further object of this invention to provide an improved end of aisle control system wherein a materials handling vehicle is permitted to resume a higher operating speed prior to entering an aisle under certain operating conditions.

It is still a further object of this invention to provide a magnet indicating an end aisle blocked zone to prohibit further travel of the vehicle in an auto-guided mode.

It is another object of this invention to provide a method for establishing the operating parameters to be used in an end of aisle control system for an operator controlled materials handling vehicle comprising the steps of establishing a plurality of auto-guided vehicle operating zones, placing magnets in the aisles to identify the boundaries of each of the zones, establishing vehicle control functions in response to a transition of the vehicle from one zone to another, establishing operating parameters for the vehicle within each of the zones, sensing the zone identifying magnets, and controlling the vehicle while transitioning from one zone to another and within each of the zones in accordance with the operating parameters.

It is yet another object of this invention to provide a method for establishing the operating parameters to be used in an end of aisle control system for an operator controlled materials handling vehicle comprising the steps of establishing auto-guided vehicle operating zones; locating magnets in predetermined paths in the aisles for identifying the boundaries of each of the zones; providing the vehicle with a plurality of magnet sensors located above the predetermined paths; establishing vehicle control functions in response to a transition of the vehicle from one zone to another, depending on the direction of travel of the vehicle, and establishing maximum speed limits for the vehicle within each of the zones based on direction of travel within the zone.

It is another object of this invention to provide an end of aisle control apparatus for use on an operator controlled materials handling vehicle including means for sensing floor mounted magnets in each of a plurality of paths identifying predetermined vehicle operating zones, means for sensing and controlling the speed and direction of vehicle travel, means responsive to the magnet sensing means for controlling the maximum speed of the vehicle in each of the operating zones, and means responsive to the magnet sensing means for controlling the slowing of the vehicle as it transits from a higher speed zone to a lower speed zone.

It is another object of this invention to place a magnet in the floor of the aisle and monitor the distance the vehicle travels after passing the magnet; to limit the speed of the vehicle to a specified slowdown speed after it has traveled a predetermined distance (which could be zero) toward the nearest aisle end after detecting the presence of the magnet, and then to stop the vehicle or to permit travel at its maximum speed after the vehicle has traveled a second predetermined distance.

It is still a further object of this invention to provide a method of controlling the operation of a operator controlled materials handling vehicle as it approaches an end of an aisle, the method comprising the steps of placing first and second magnets in the floor of the aisle, the magnets being spaced apart a first predetermined distance in the direction of movement of a vehicle, providing separate first and second magnet sensors on the vehicle for detecting the passage of the vehicle over the first and second magnets, respectively, monitoring the distance the vehicle travels after passing at least one of the magnets, limiting the speed of the vehicle a second predetermined distance in the direction of the vehicle travel toward the nearest aisle end after detecting the presence of at least one of said magnets, and stopping the vehicle if the second magnet has not been detected within a predetermined distance after the detection of the first magnet.

Other objects and advantages of the invention will be apparent from the following description, the accompanying drawings and the appended claims.

BRIEF DESCRIPTION OF THE DRAWINGS

FIG. 5 is a plan view of a warehouse showing an aisle formed between a pair of storage racks where each end of the aisle opens into a larger area where manual guided operation may be used, and where floor mounted end-aisle magnets are placed in the aisle toward the ends of the racks to identify the approach of the end of the aisle;

FIG. 6 is a plan view similar to FIG. 5 wherein one end of the aisle is blocked and wherein additional floor mounted end-aisle-blocked magnets are installed at the blocked end;

FIG. 9 is a plan view of another embodiment of the invention wherein two sets of racks are separated by an intersecting aisle and wherein floor mounted magnets are placed in one path to instruct the vehicle to slow down to a predetermined speed, wherein another set of magnets are placed in a second path to instruct the vehicle to stop, and wherein a third set of magnets are positioned in the intersection to permit the vehicle to resume its in-aisle operating parameters prior to actually entering the aisle;

FIG. 10 is an enlarged plan view of a portion of FIG. 9 illustrating the stopping distances of the vehicle at different speeds relative to the end of an aisle;

FIGS. 12A and 12B together comprise a software flow diagram illustrating the process for selecting the speeds permitted in the different modes of operation used in the end of aisle control system of the present invention;

FIGS. 13A and 13B together comprise a software flow diagram illustrating the operation of the end-aisle sensors;

FIGS. 15-20 are software flow diagrams describing the setup procedure available through the service terminal for the end of aisle control system;

FIGS. 21-31 are the setup messages presented on the service terminal at the time the end of aisle control system is initially set up or modified;

FIG. 37 is a software flow diagram describing the setup procedure for the embodiment illustrated in FIG. 32.

DESCRIPTION OF THE PREFERRED EMBODIMENT

Figure 1:
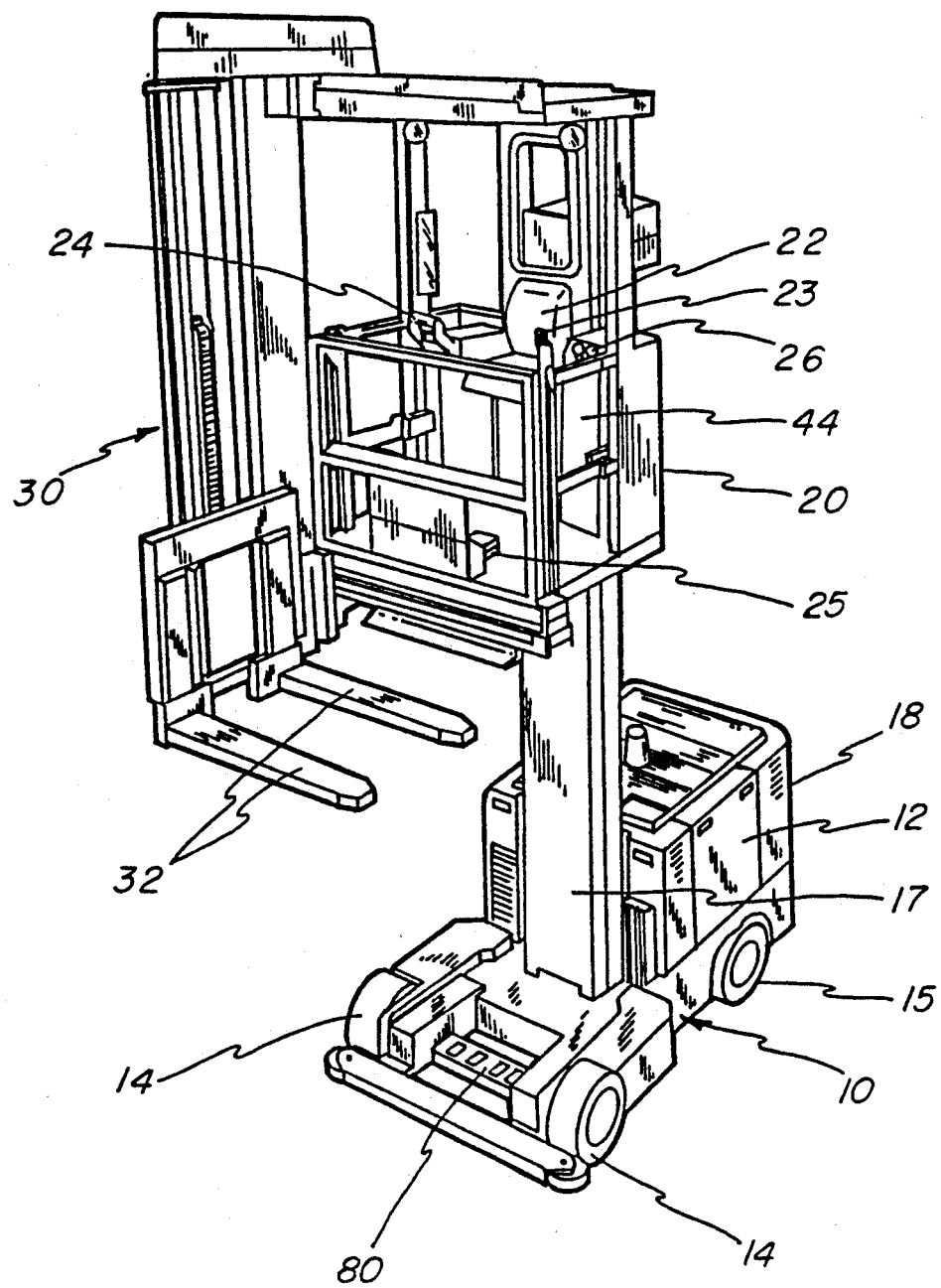
FIG. 1 is a perspective view of a materials handling vehicle employing the buried magnet detection system of the present invention.

Referring now to the drawings, and particularly to FIG. 1 which illustrates a operator controlled materials handling vehicle or truck of the type that may include the end of aisle control system of the present invention, the truck, such as a turret stockpicker, typically includes a power unit 10, a platform assembly 20, and a load handling assembly 30.

Figure 2:
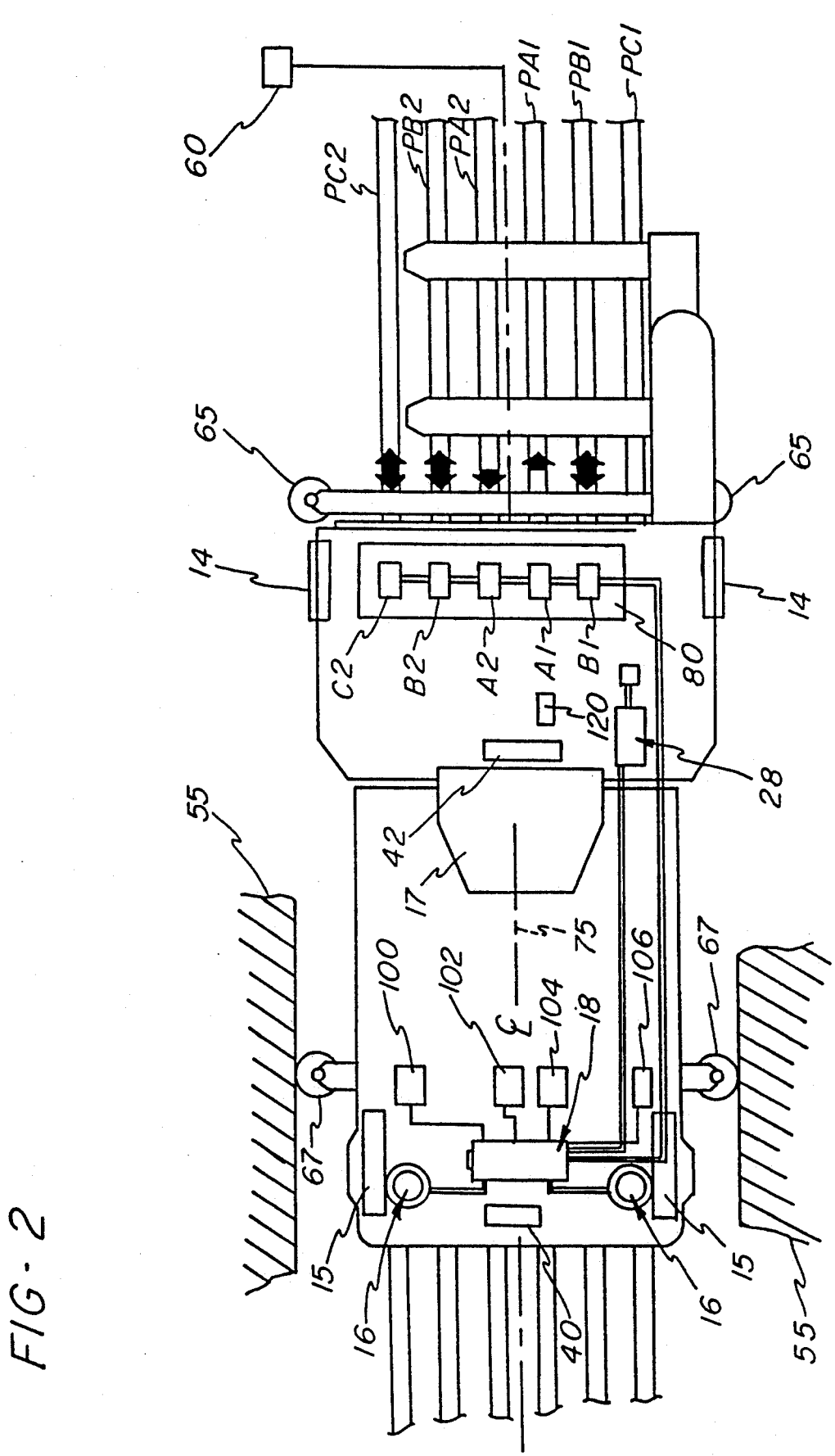
FIG. 2 is a schematic plan view of a materials handling vehicle showing the location of some of the components comprising the end of aisle control system of the present invention.

The power unit 10 includes a power source, such as a battery unit 12, a pair of load wheels 14 positioned under the platform assembly, a pair of steered wheels 15 positioned under the rear end of the power unit 10 with each wheel being driven by a traction motor 16, a mast 17 on which the platform assembly 20 rides, and a power unit electronic control unit 18 (FIG. 2). Both the load wheels and the steered wheels are provided with mechanical brakes.

The platform assembly 20 includes a seat 22 from which the operator can control a steering tiller 23, traction motor control 24, brake pedals 25 and forklift controls 26. The platform assembly 20 includes an electronics package 28 (FIG. 2) which is interconnected with the power unit electronics control unit 18 by means of an appropriate electrical cable.

The load handling assembly 30 includes a pair of lift forks 32 which may be raised and lowered and also rotated relative to the platform assembly by means of the controls 26.

For wire guidance, the power unit 10 supports two sensor bars 40 and 42 (FIG. 2). Sensor bar 40 is located between the steerable wheels 15 while the sensor bar 42 is placed near the mast 17. Both sensor bars are designed to detect a wire 50 embedded in the floor 52 of a warehouse. The wire 50 is held in place in the floor by epoxy 53.

When used in the wire guidance mode, the wire 50 is placed down the center of narrow aisles between storage racks in the warehouse. A line driver 60 causes an alternating current to pass through the wire at a frequency in the range of form 4-12 kHz, causing the wire to radiate a signal which is detected by sensor coils (not shown) carried by the sensor bars 40 or 42.

For rail guidance, the truck is provided with fixed guide rollers 65 mounted at the platform end of the truck and rollers 67 placed just ahead of the steered wheel 15. These rollers engage rails mounted on the racks. The rollers 67 actuate spring loaded switches (not shown) when the vehicle is properly positioned between the racks. These switches will cause the power unit electronic control unit 18 to disengage the steered wheels and to allow the vehicle to be guided solely by the rails on the racks.

For both wire and rail guidance systems, magnets 70 are buried in the warehouse floor 52 are used to control various functions, depending on a particular application. A typical magnet is approximately 3 inches long by 2 inches wide by 1 inch thick with its north magnetic pole facing upwardly and its upper surface placed ¼ inch under the floor surface. As shown, the magnets are placed in one of up to six paths that may be used in any particular application. For example, paths PA1 and PA2 are normally used for End-Aisle magnets, paths PB1 and PB2 are used for Auto-Resume magnets, and paths PC1 and PC2 are used for End-Aisle-Blocked magnets. The function of these magnets will be discussed hereinafter.

The centers of the magnets in paths PA1 and PA2 are placed a distance "a" (approximately 8 inches) on either side of the center line 75, the centers of any magnets in paths PB1 and PB2 are placed a distance "b" (approximately 12 inches) from the center line, and the centers of any magnets in paths PC1 and PC2 are placed a distance "c" (approximately 16 inches) from the center line 75 of the vehicle.

A buried magnet sensor bar 80 is shown positioned between the load wheels 14 of the truck 10 in FIGS. 1 and 2. This bar carries one or more buried magnet sensing means or sensors 82. Magnet sensors, such as Hall effect devices, are employed and are preferably mounted for lateral adjustment on the bar 80 on either side of the center line 75 of the vehicle.

Figure 3:
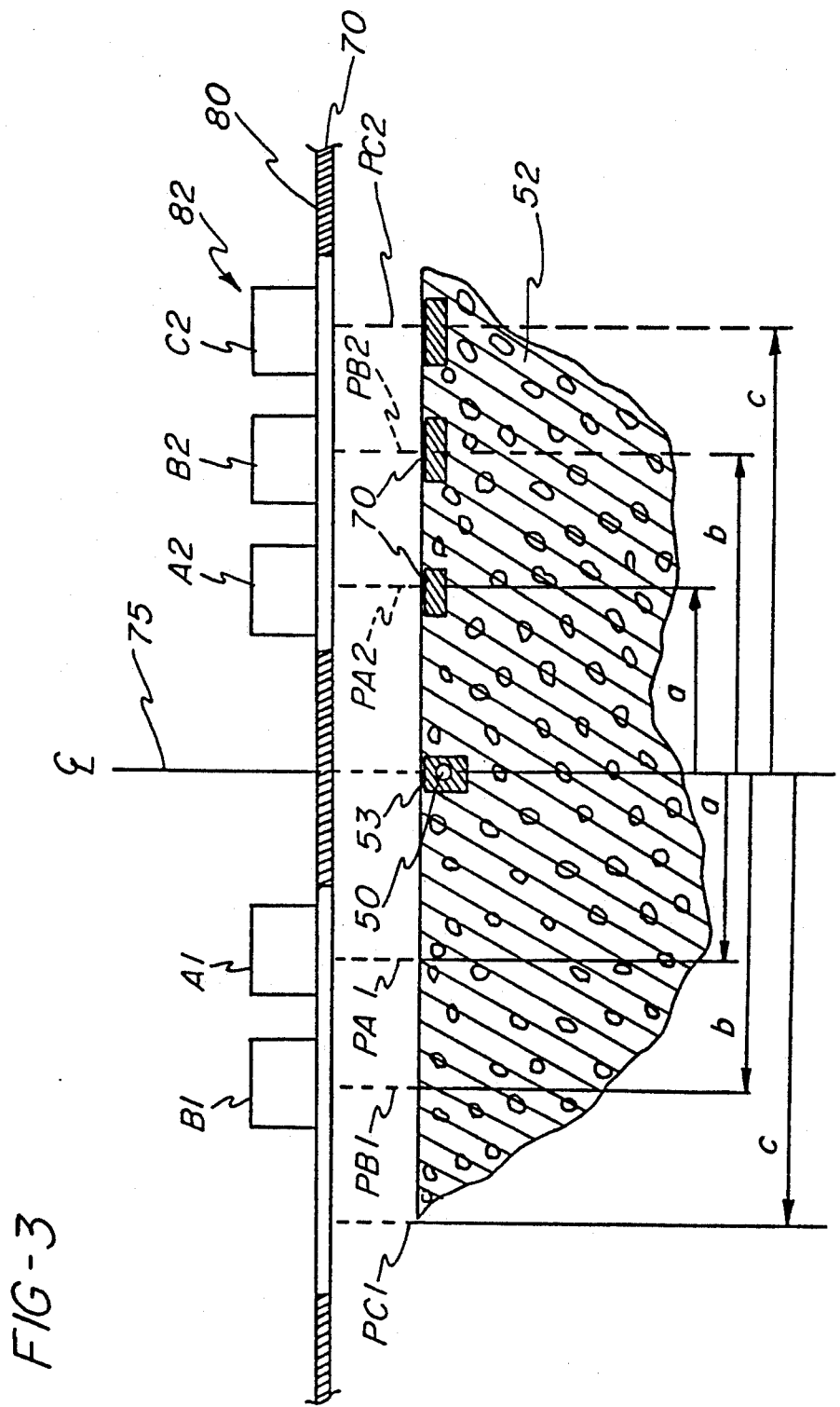
FIG. 3 is a simplified cross sectional elevational view showing the location of buried magnets and their relationship to magnet sensors carried by the vehicle.

The sensors 82 are placed approximately 1 inch above the floor. As shown in FIG. 3, sensors 82 include sensors A1 and A2 positioned to detect the magnets 70 in paths PA1 and PA2, sensors B1 and B2 positioned to detect magnets 70 in paths PB1 and PB2, and sensor C1 positioned to detect magnets 70 in paths PC1 and PC2. One example of a magnet sensor bar is shown in copending U.S. patent application Ser. No. 07/682,283, filed Apr. 9, 1991, now abandoned, assigned to the same assignee as the present invention. In one embodiment of this invention, only four magnet sensors are employed, so the bar 80 will carry either sensor B2 or C1 but not both.

As shown in FIG. 2, path PA1 is provided with an arrow indicating that the sensor A1 is used to detect a magnet in this path when the vehicle is traveling in the forward direction. Path PA2 is annotated with an arrow indicating that sensor A2 is used to detect a magnet in this path when the vehicle is moving in the reverse direction. The other paths have bi-directional arrows to indicate that the other sensors may detect magnets in those paths regardless of the direction of vehicle travel.

Because Hall effect sensors are sensitive to the polarity of the magnetic field, it is possible to space the paths PA1, PB1 and PC1 and the paths PA2, PB2 and PC2 closer together, and to place the sensors correspondingly closer than that described above if the magnets 70 in adjacent paths are installed with their magnetic polarity in opposite senses. Of course, the polarity of the sensors will have to be adjusted accordingly.

Figure 4:
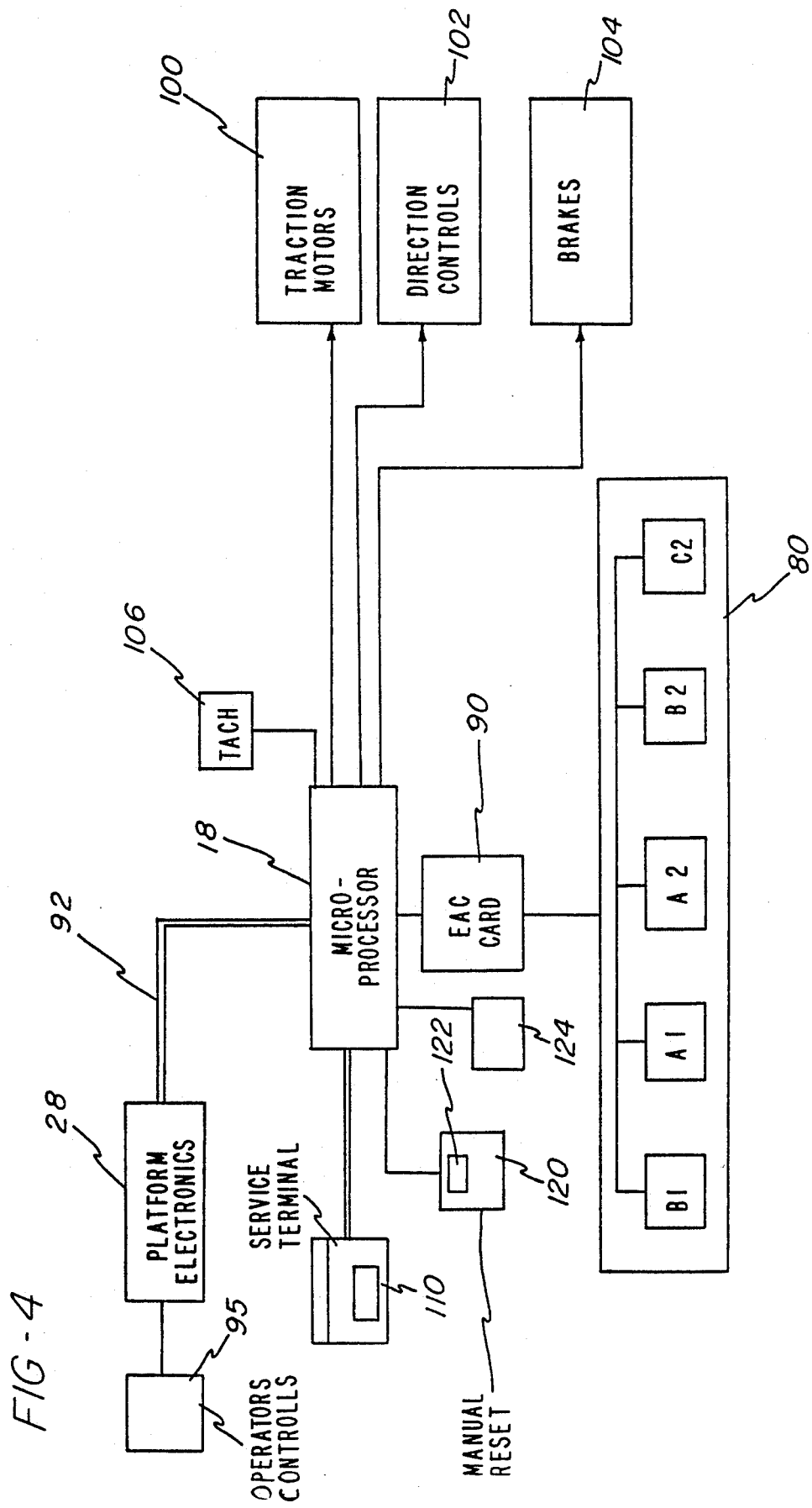
FIG. 4 is a simplified block diagram of an end of aisle control system.

In the simplified electrical block diagram of FIG. 4, the sensors carried by the support bar 80 are connected to an End of Aisle Control (EAC) card 90 which presents the signals from the sensors to the power unit electronic control unit or microprocessor 18. As stated previously, the microprocessor 18 is connected to the platform electronics package 28 by a cable 92, which in turn is connected to the operator's controls, shown generally in block 95. The microprocessor 18 controls the speed of the vehicle through traction motor circuit 100, travel direction through direction control circuit 102 and braking through brake control circuit 104. The vehicle's speed and direction of travel is indicated by tachometer 106.

The microprocessor 18 may be accessed through a service terminal 110, which includes a keyboard and a display panel, to establish the operating condition of the vehicle, read fault memory circuits, and set certain operating parameters into the microprocessor's memory. It is through the service terminal that the vehicle control functions and operating parameters for the end of aisle control system is placed into the microprocessor 18. Also shown in FIG. 4 is a manual release button 120 that is used by the vehicle's operator under certain circumstances to be described later.

Figure 7:
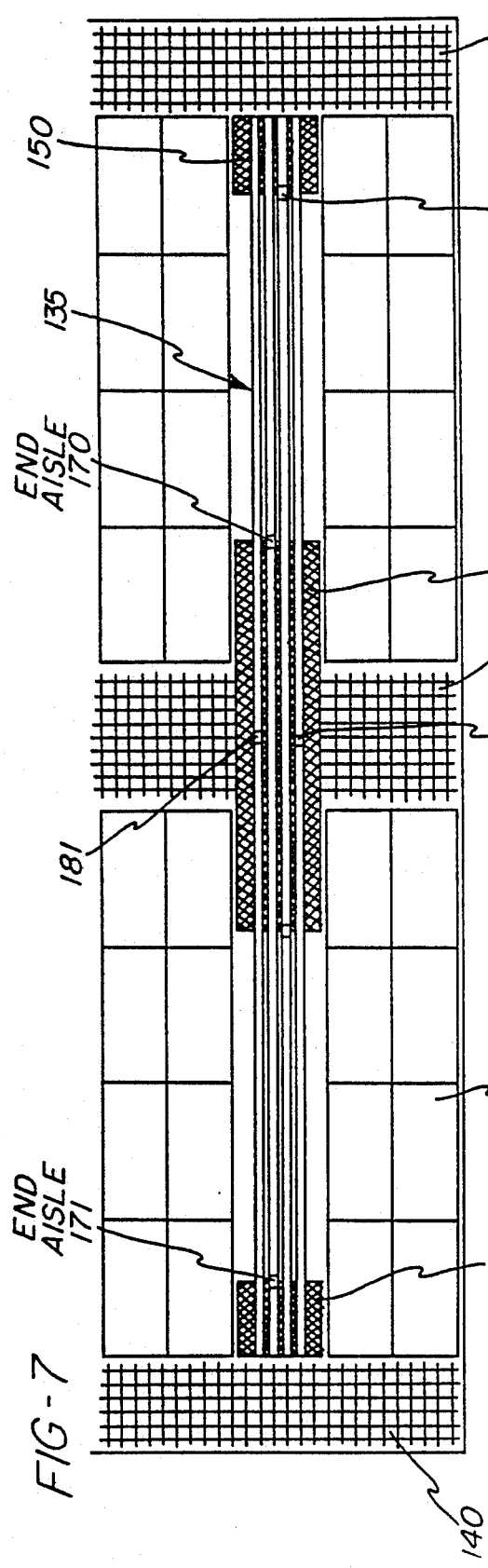
FIG. 7 is a plan view similar to FIG. 5 wherein two sets of racks are separated by an intersecting aisle and wherein additional floor mounted auto-resume magnets are positioned in the intersection to permit the vehicle to resume its in-aisle operating parameters prior to actually entering the aisle.
Figure 8:
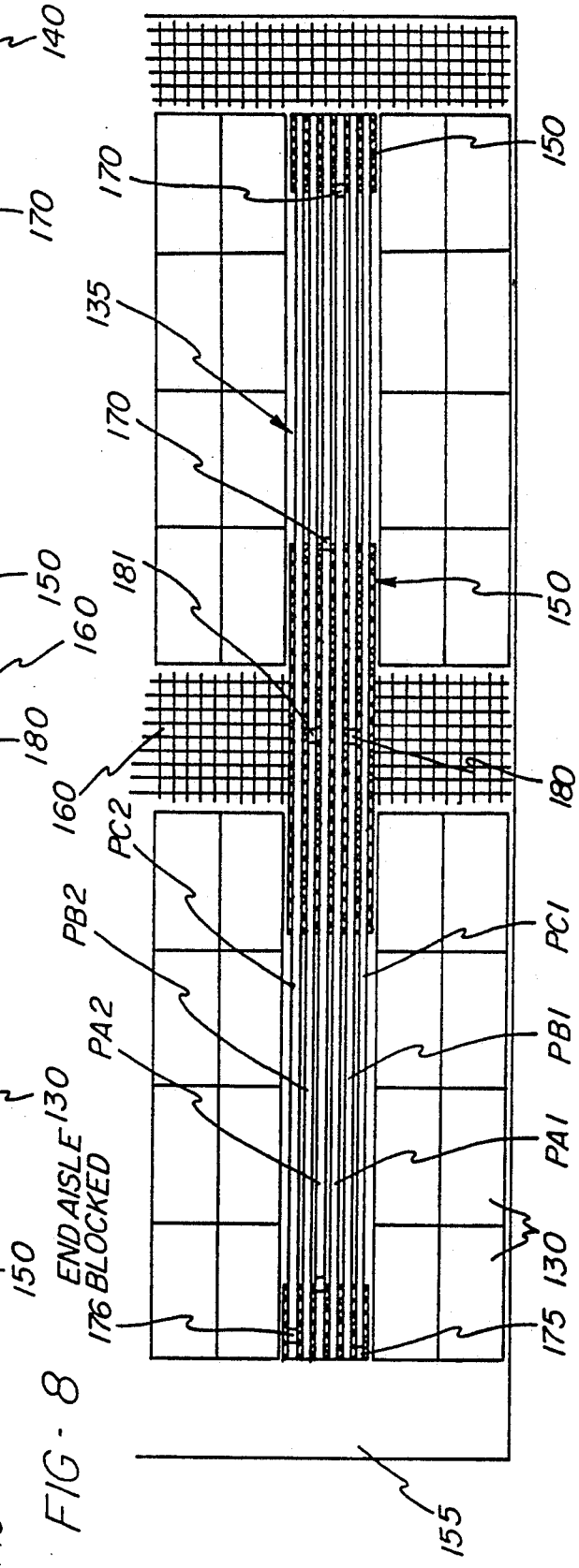
FIG. 8 is a plan view similar to FIG. 7 wherein one end is blocked and wherein floor mounted end-aisle-blocked magnets are installed.

FIGS. 5-8 illustrate various warehouse configurations where an operator controlled materials handling vehicle employing an end of aisle control system. In each of these drawings, storage racks 130 are shown on either side of an aisle 135. A plurality of operating zones has been established, as shown in these drawings. A manual guided zone 140 (checkered pattern) is shown beyond at the ends of the aisles, an auto-guided zone 145 is shown generally centrally in each aisle, and an end of aisle zone 150 (cross hatched pattern) is shown near the ends of the racks. Also shown in FIGS. 6 and 8 is a wall or conveyor 155, which of course represents a blocked aisle. FIGS. 7 and 8 also show an intersecting aisle 160 which may also be a manual guided zone. Within each of these operating zones, certain vehicle operating parameters are established, and when transitioning from one zone to another, certain vehicle control functions are established, as will be explained.

These boundaries of the zones are defined by the placement of magnets in the floor in the proper path. In FIG. 5, the auto guided zone 145 is defined as the space between the end-aisle magnets 170 and 171 placed in paths PA1 and PA2 (as defined in FIG. 2).

In FIG. 6, in addition to the end-aisle magnets 170, 171, there are two end-aisle-blocked magnets 175 and 176 in paths PC1 and PC2, respectively, to prevent the vehicle from moving into the obstruction 155. As shown, these magnets are offset to accommodate the fact that the sensor C1 is located at the forward part of the vehicle, and therefore when the vehicle is traveling in the reverse direction, the magnet must be located further away from the obstruction.

In the configuration shown in FIGS. 7 and 8, auto-resume magnets 180 and 181 are placed in paths PB1 and PB2, respectively, in the end aisle zone shown crossing the intersection 160. If two sensors B1 and B2 are employed, only one magnet is required; if only one sensor B1 or B2 is employed, then two magnets are required. This arrangement permits the magnet or magnets to be detected regardless of the direction of travel of the vehicle.

An alternative embodiment is shown in FIGS. 9 and 10. In this embodiment, paths PA1 and PA2 are used for end of aisle slowdown magnets, and paths PB1 and PB2 contain end aisle stop magnets. When the vehicle enters an end of aisle zone 150, it will encounter an end aisle slowdown magnet 190 and the vehicle will begin to slow to a predetermined speed, such as 2 mph. Stopping the vehicle under automatic control will be done only after the vehicle reaches an end aisle stop magnet 195.

As best shown in FIG. 10, the reason for this procedure is to permit the operator to operate conveniently near the last bay of a storage rack without having to operate the manual release switch 120. By way of illustration, if the vehicle were traveling at its maximum rate of speed when it entered the end aisle zone 150, and it was commanded to stop, it would travel a distance L1 before coming to a complete stop. On the other hand, if the vehicle were traveling at a much lower speed, it would only travel a distance L2 before stopping. If the vehicle were operating under the method described in connection with FIG. 5 and had intended to work in one of the bays 130a of the rack 130 at the end of the aisle, and had entered into the end aisle zone at the lower speed, then he would be required to operate the manual release switch 120 before continuing his mission. In this embodiment, on the other hand, the vehicle will be slowed to a predetermined maximum speed, which will allow the vehicle to be stopped in a distance L3. Thus, placing an end aisle stop magnet 195 a distance L3 from the beginning of the manual guided zone 140 will assure that the vehicle can be brought to a complete stop before entering intersection.

A further modification would be to slow the vehicle upon entering the end aisle zone 150, and then by using the tachometer 106, determine when the vehicle has reached a position a distance L3 from the intersection.

As disclosed, if paths PA1 and PA2 are used for end aisle slowdown magnets 190, and paths PB1 and PB2 are used for end aisle stop magnets 195, the paths PC1 and PC2 may be used for either auto resume magnets 180 or 181, or for end blocked magnets 175 or 176, depending on a particular application.

Figure 11A:
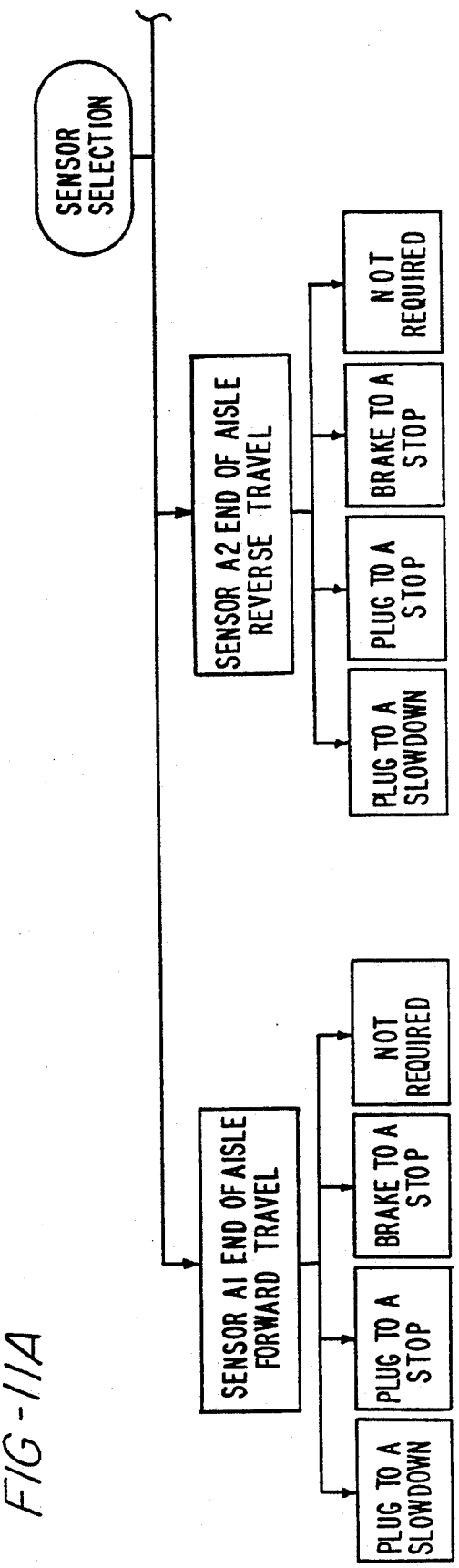
FIGS. 11A and 11B together comprise a software flow diagram illustrating the process for selecting the sensor to be used in the end of aisle control system of the present invention.
Figure 11B:
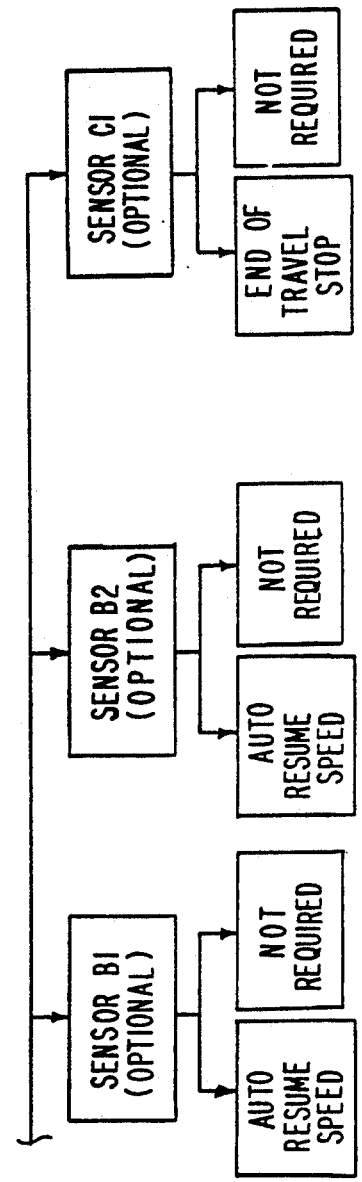

The software flow diagram of FIG. 11 describes a sensor selection routine for establishing vehicle control functions in response of the transition of the vehicle from one zone to another in the examples described above. This selection is made from the service terminal 110 and the parameters are stored in memory in the microprocessor 18. As shown, the selection is made for sensors A1 and A2 and optionally for sensors B1, B2 and C1. Referring also to FIGS. 22 and 23, the selection for sensors A1 and A2 is either (1) Plug To A Slowdown (SCR>0), (2) Plug To A Stop (SCR=0), (3) Brake To A Stop (BRAKE), or (4) Not Required (NONE). The service terminal shows the present setting and permits either the modification or the setting or selection another option.

Sensors B1 and B2 may be made operational by selecting the Auto Resume (RESUME) setting (FIGS. 26 and 27), or they may be ignored by selecting Not Required (NONE). Similarly, sensor C1 may be either selected by choosing the End of Travel Stop (STOP) or they may be ignored by selecting the Not Required (NONE) setting (FIG. 28).

Referring now to the software flow diagram of FIG. 12, the operating parameters for the vehicle in each zone, or maximum permitted travel speed of the vehicle in each of the operating zones is programmed and stored in the microprocessor 18. This process is also done through the service terminal 110. When the Manual Guidance Mode (FIG. 12) or Manual Guide Speed selection on the terminal (FIG. 29) is accessed, a maximum vehicle speed of from 1 to 6 mph, in 1 mph increments, may be selected. Similarly, when either the Automatic Guidance Mode (FIG. 12) or Auto Guide Speed (FIG. 30), or the End of Aisle Control Mode (FIG. 12) or End of Aisle Speed (FIG. 31) is selected, a maximum vehicle speed for these zones may be chosen.

Figure 13A:
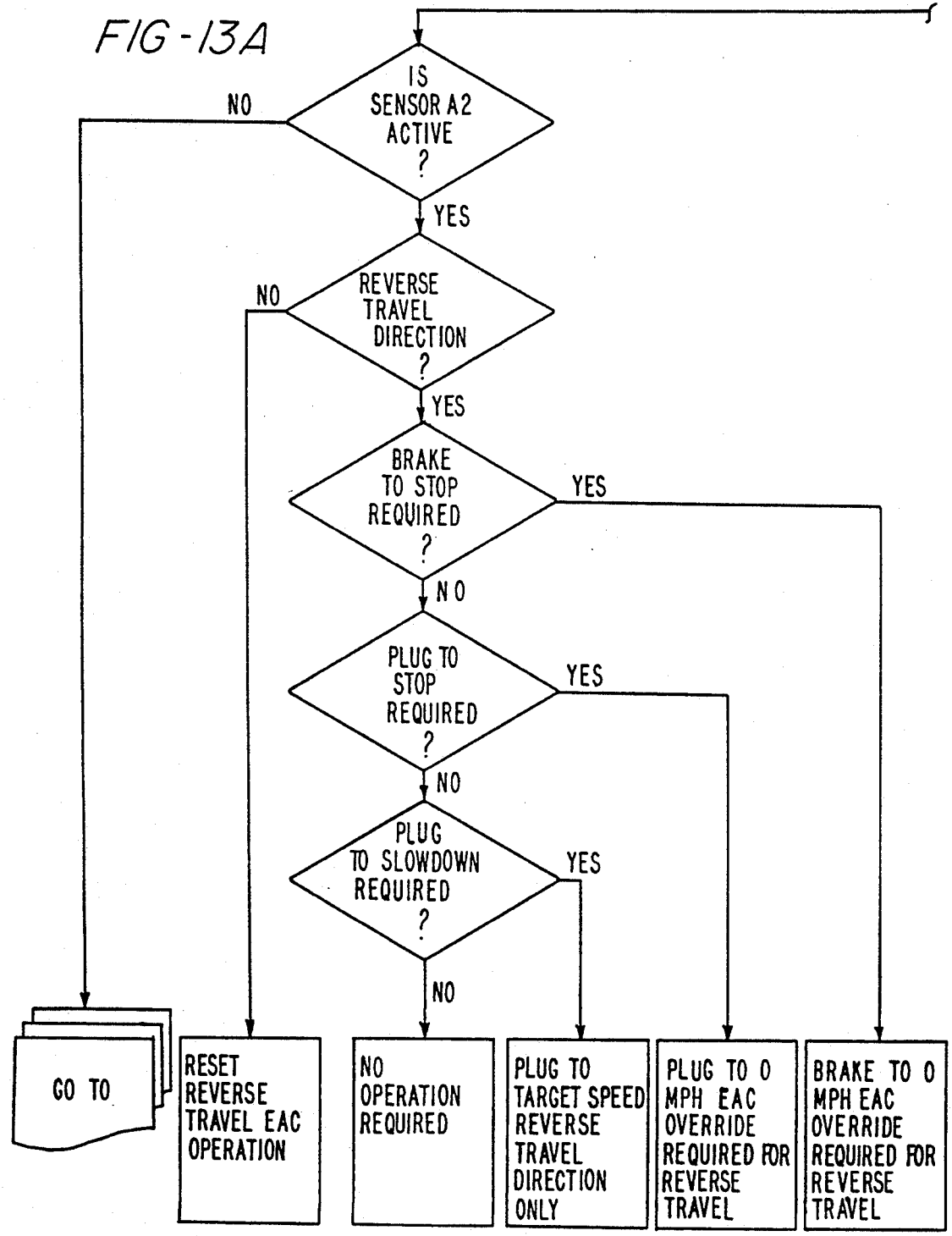
Figure 14A:
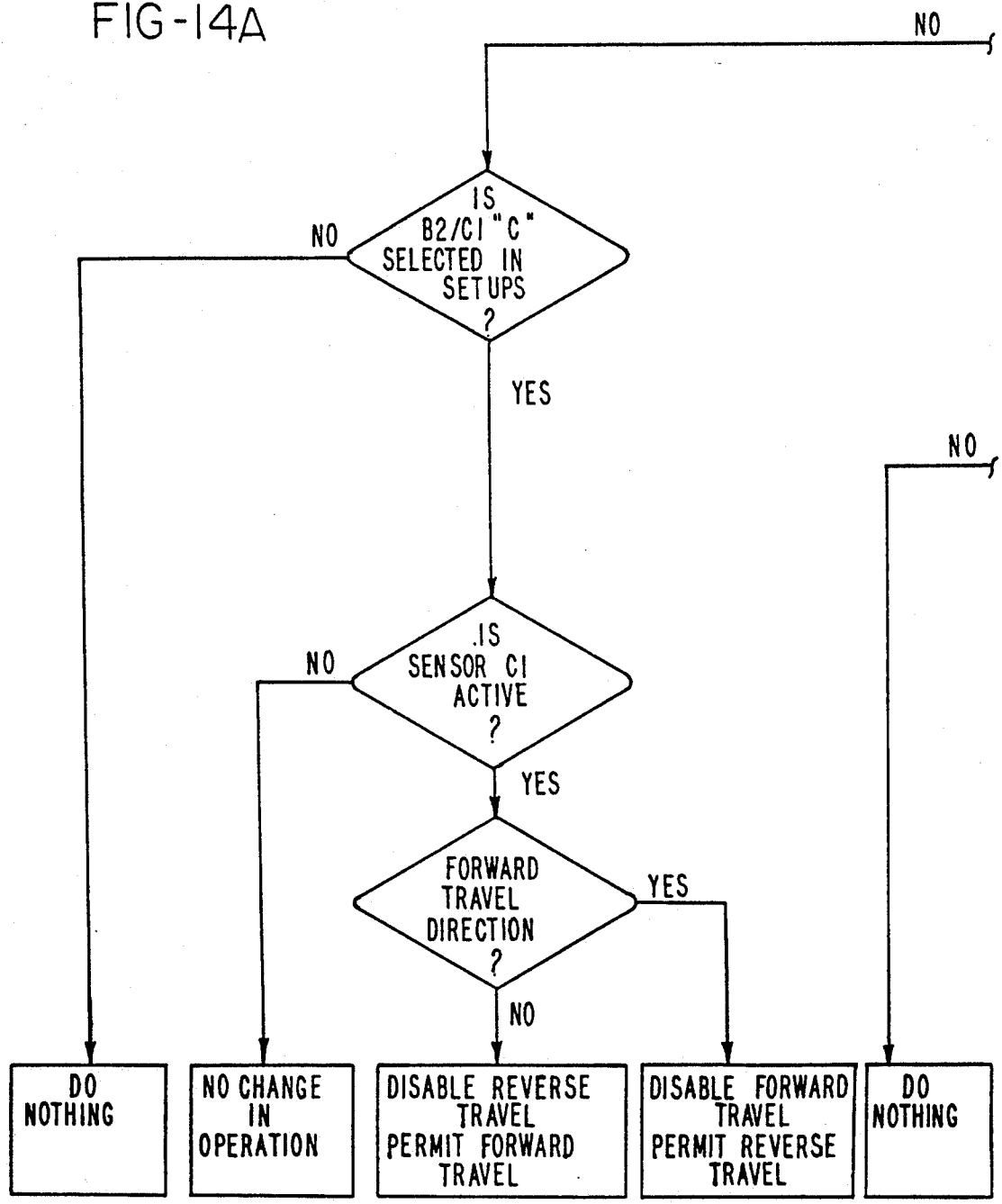
FIGS. 14A and 14B together comprise a software flow diagram illustrating the operation of the auto-resume and end-aisle-blocked sensors.
Figure 14B:
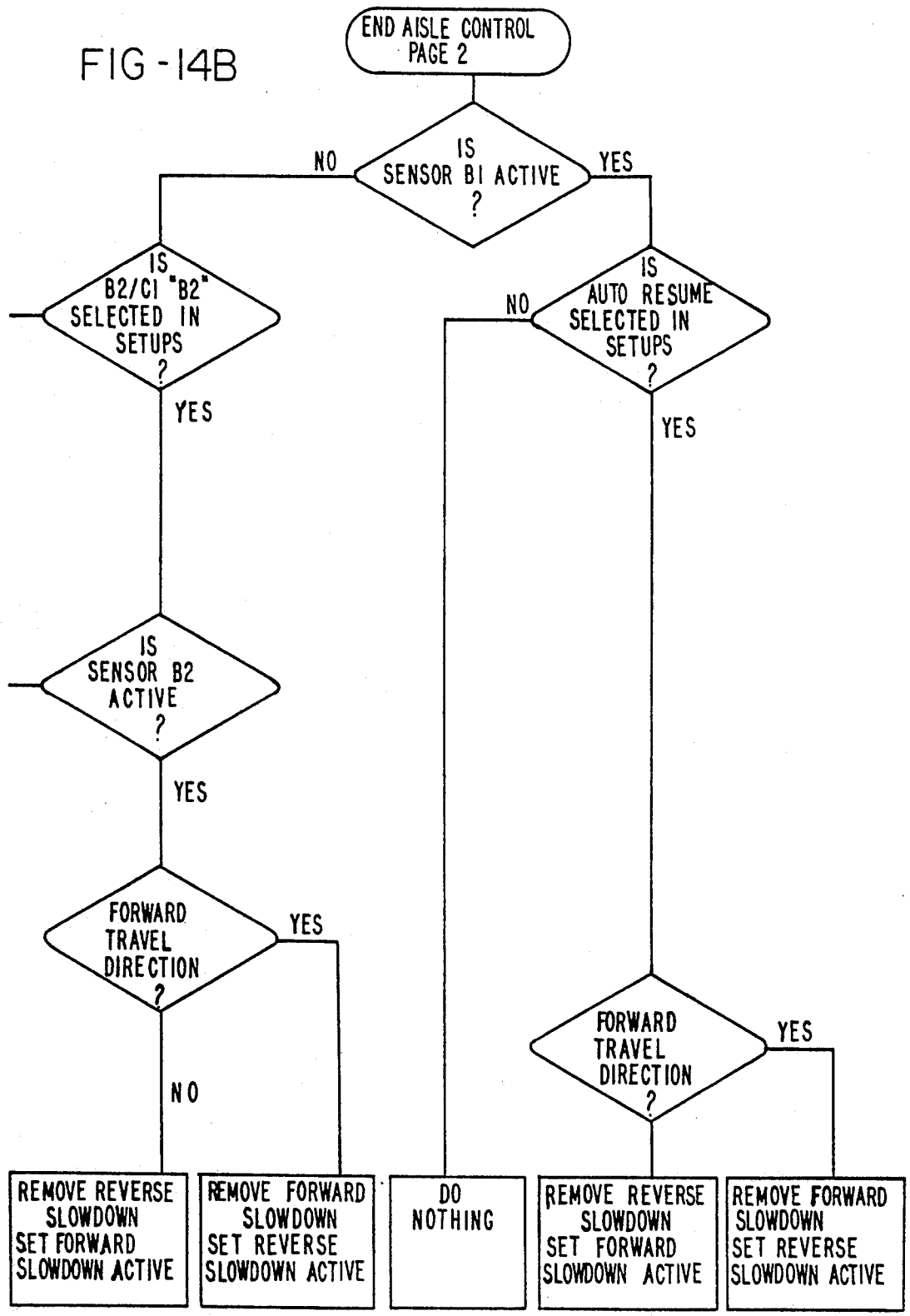
Figure 18:
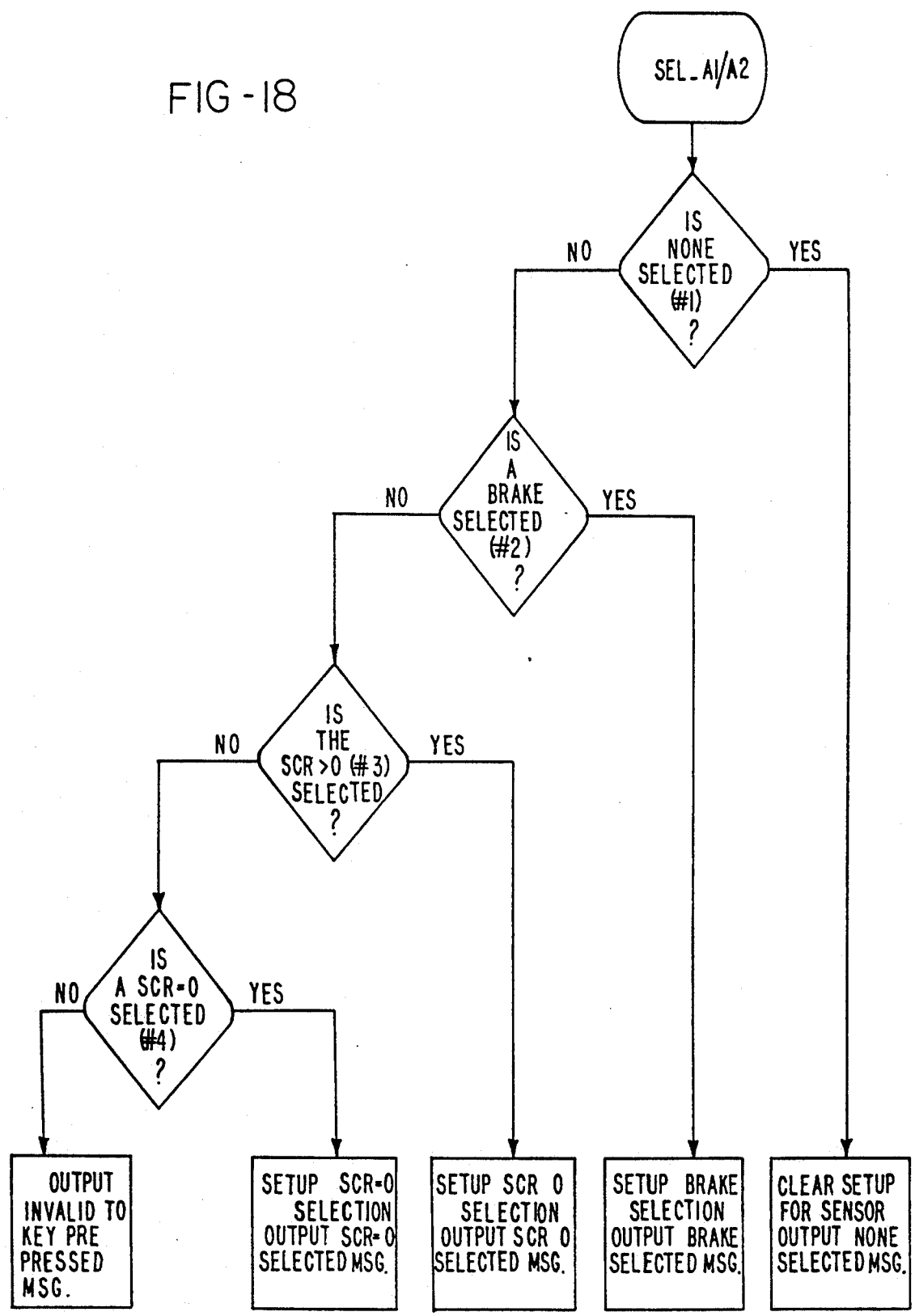
Figure 19:
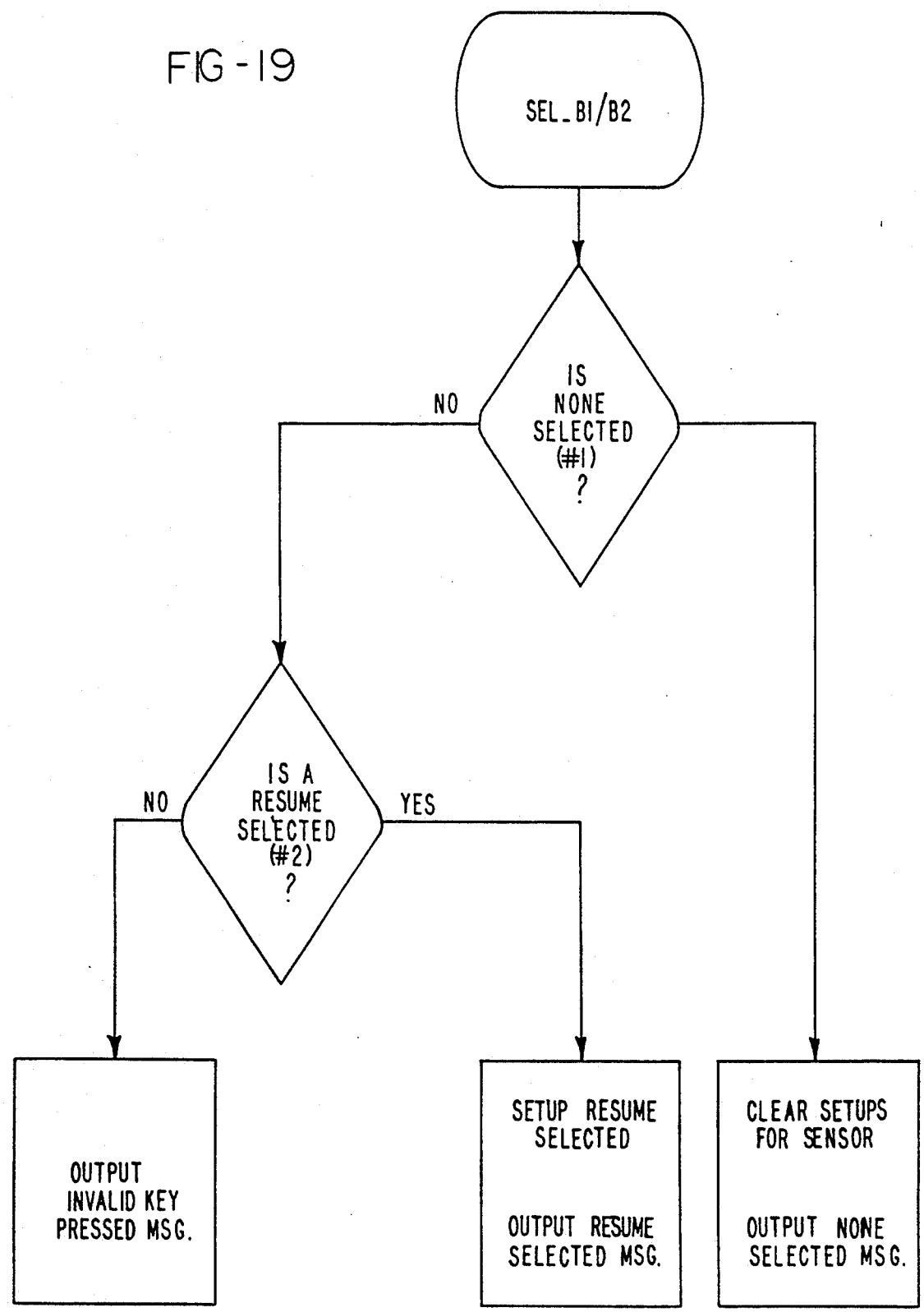

Once the vehicle control functions and operating parameters have been selected and stored in the microprocessor 18, the end of aisle control system may be operated as illustrated in FIGS. 13 and 14. In these flow diagrams, the term "active" means that the sensor has been not been set to "NONE" on the service terminal. The vehicle may be braked to a stop by means of the mechanical brakes associated with each of the wheels 10 through the brake control circuit 104. The vehicle may also be plugged to an end of aisle slowdown target speed or to a stop by the SCR traction motor control circuit 100. Plugging means to use the traction motors themselves to slow or stop the vehicle.

The flow diagram of FIG. 14 assumes that only four sensors are to be used in the end of aisle control system. In one embodiment of the invention, either sensor B2 or C1 is used, but not both. Of course, the vehicle could be equipped with both, with an appropriate modification of the flow diagram to accommodate both sensors.

Thus, as the vehicle transits from one zone to another the speed of the vehicle is controlled, as well as the method of slowing or stopping the vehicle, if required during the initial configuration of the system. Under some circumstances, manual operation of the manual release switch 120 by the operator will be required to override the end of aisle control program before the vehicle can resume normal operation. This override may be necessary before the vehicle can continue travel and is indicated by a flashing light 122 and an audible alarm 124 associated with the manual release switch 120.

Normally, operation of the manual override switch will be required whenever the vehicle is automatically brought to a stop upon entering an end of aisle zone. After the vehicle has completely stopped, the operator must depress the manual override switch before continued operation may begin. This insures that the operator is aware of the change in zones. On the other hand, when the vehicle has been programmed merely to slow when entering the end of aisle zone 150, the light 122 will glow steadily and upon entering that zone, the audible alarm 124 will sound momentarily.

FIGS. 15-20 are the software flow diagrams describing the setup procedure available through the service terminal for the end of aisle control system. The setup procedure is initiated with the TERM_PSWD program, which in turn is accessed through the service terminal 110. The service terminal displays the messages shown in FIGS. 21-31 as the program is sequentially accessed.

An alternative to the use of a plurality of magnets in specified paths, as described above, would be to use the output pulses from the tachometer 106 to measure a distance from one of the magnets and to specify the action to be taken at predetermined locations. For example, the auto resume function may be programmed to take place a specified distance after an end aisle magnet 170 has been detected. For that matter, any zone may be designated by reference to a distance from any given magnet and any control functions may be performed at specified distances from such reference magnet.

Also, it is not required that the vehicle begin slowing immediately upon sensing an end aisle slowdown magnet; it could begin a programmed slowdown some distance from that magnet or the start of the slowdown process could be determined in part by the speed of the vehicle. This would permit the magnets to be permanently placed or to use existing magnets, but yet allow wide latitude in the control of the vehicle through the use of the microprocessor.

Since Hall effect devices are used to detect the floor mounted magnets, it is also possible to use the polarity of the magnet to indicate a particular control function. It is possible, with proper switching techniques, to use a single Hall effect sensor to sense magnets of either polarity, and to identify which polarity was detected.

A battery backed up memory in the microprocessor 18 retains information relating to the direction of travel and the operating zone so that even if the vehicle is turned off, or the battery unit 12 is removed, or the manual mode of operation is selected, the operating parameters of the vehicle are also retained.

Another embodiment of the invention is described in FIGS. 32-37. In this embodiment, as shown in the partial plan view of the end of an aisle, a pair of magnets 200 and 205 are used to designate the end of aisle zone. Magnet 200 is in path PA1 and magnet 205 is in path PB1. It is to be understood that corresponding magnets will be found at the other end of the aisle. These magnets may also be referred to as the A and B magnets, respectively. Magnet 200 is placed a distance X from the end of the aisle and magnet 205 is placed a distance Y from magnet 200. In a preferred embodiment of this invention, magnet 200 is placed 38 feet from the end of the aisle while magnet 205 is placed 2 feet from magnet 200.

As illustrated by the software flow diagrams of FIGS. 33-36, the magnet 200, the A magnet, is normally detected first as the vehicle travels toward the end of the aisle. After the vehicle has traveled a predetermined distance following detection of magnet 200, it will begin a slow down to a preset slow down speed, unless it was already at the slowdown speed. The rate of slow down is checked to ascertain whether the vehicle is actually slowing. As shown in the SLOW subroutine of FIG. 36, if the speed of the vehicle is above the slowdown speed at the time the vehicle crosses the A magnet, then a 5% slowdown of the vehicle within 5 feet is expected. If not, then a fault code is generated and the vehicle is braked to a stop.

Figure 33:
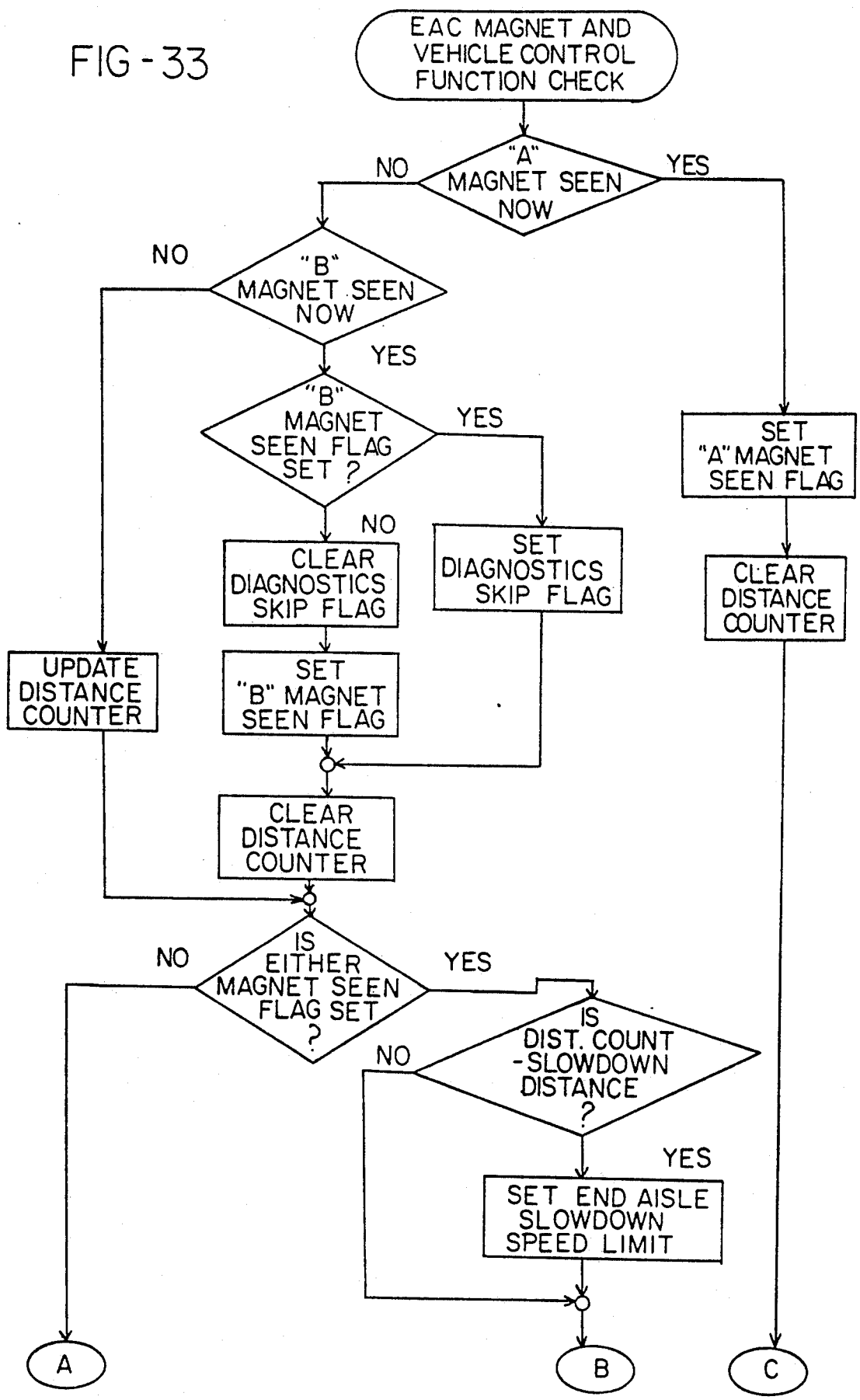
FIGS. 33-36 are software flow diagrams describing the operation of the end aisle embodiment shown in FIG. 32.
Figure 34:
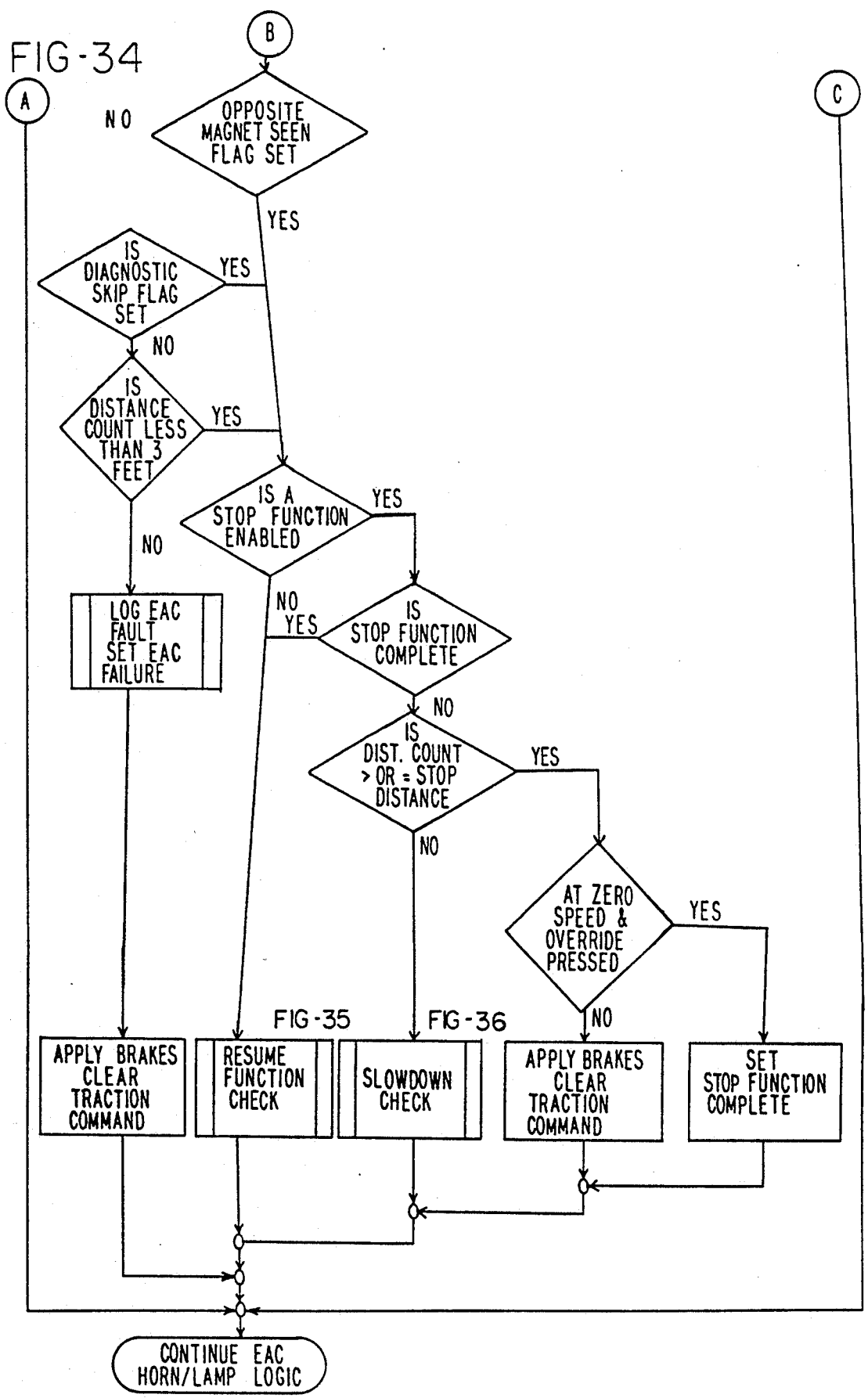

Another feature of this invention is a self checking or diagnostic feature which uses both the A and B magnets. The vehicle is expected to cross the A magnet first, and then cross over the B magnet after travelling a predetermined distance. If the B magnet is not detected within that distance, or if the A magnet has not been detected at the time the vehicle crosses the B magnet, then a fault condition exists. As shown in FIGS. 33 and 34, when the A magnet is detected, an A Magnet Seen flag is set, and when the B magnet is detected a B Magnet Seen flag is also set.

A distance counter is normally cleared upon detection of the A magnet and starts measuring the distance the vehicle travels in response to the output of the tachometer 106. When the value stored in the distance counter reaches a predetermined distance (the slowdown distance), a slowdown routine will be initiated. When the B magnet is detected, the distance counter is cleared once again, and slowdown will be dalyed until the vehicle has travelled the showdown distance from magnet B. This assures that the slowdown sequence will begin even if only one of the magnets A or B has been detected.

Since the B magnet is normally installed a distance Y from the A magnet (FIG. 32), it will be expected that the B magnet will be detected at that distance. As shown in FIG. 34, once either magnet is detected, the vehicle's travel distance is monitored, and if the vehicle travels more than a specified distance somewhat longer than the distance Y (3 feet as shown in FIG. 34), and the other magnet is not detected, a fault condition exists and the vehicle will be braked to a stop.

Figure 36:
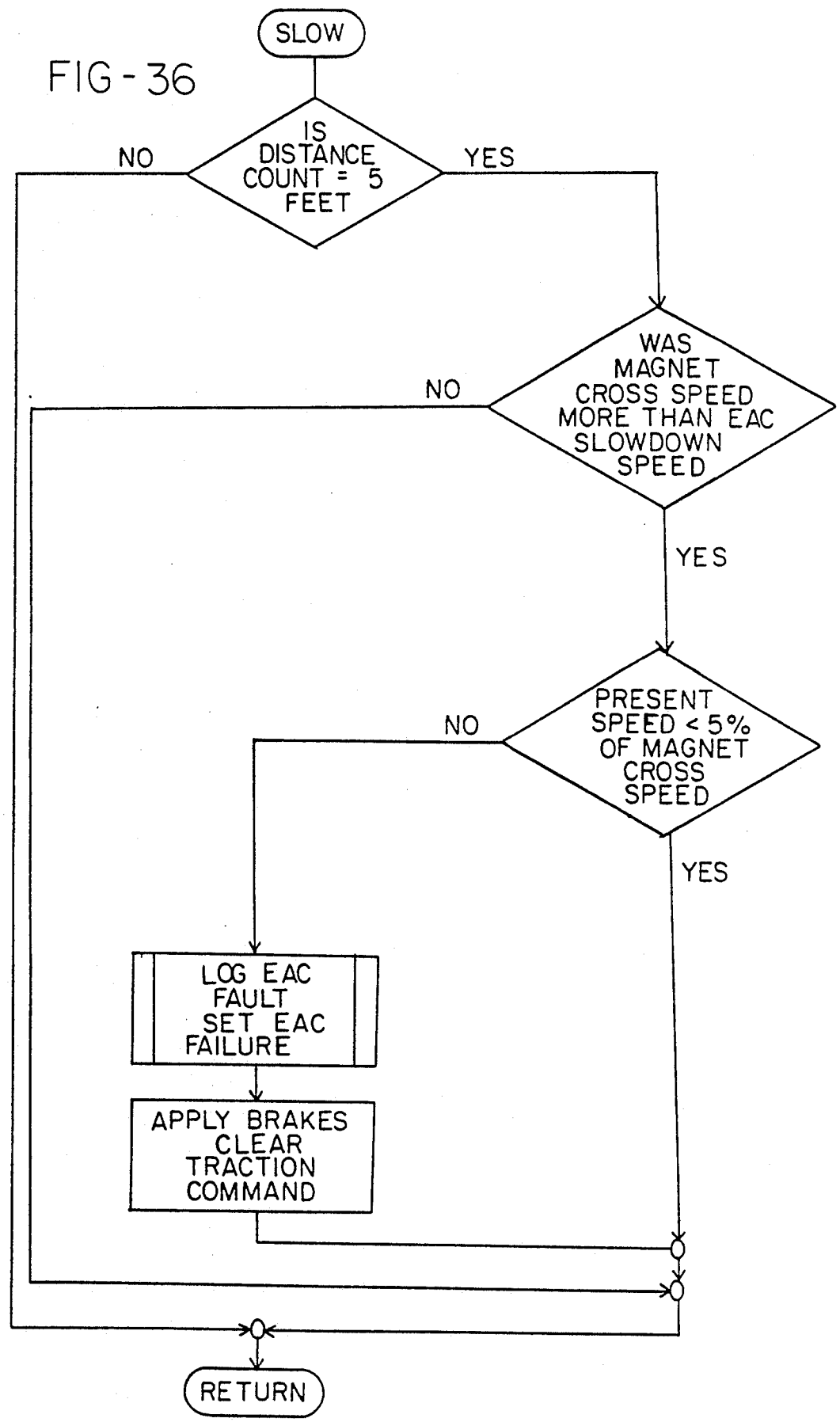

Assuming the vehicle has been configured to stop at the end of an aisle, then as the vehicle continues to travel toward the end of an aisle at or below the slowdown speed, the distance counter is monitored and when it reaches the stop distance, the stop sequence is initiated to either brake or plug the vehicle to a complete stop. Until the stop distance is reached, the SLOW program of FIG. 36 is invoked, as described above to ensure that the vehicle is functioning properly.

Figure 35:
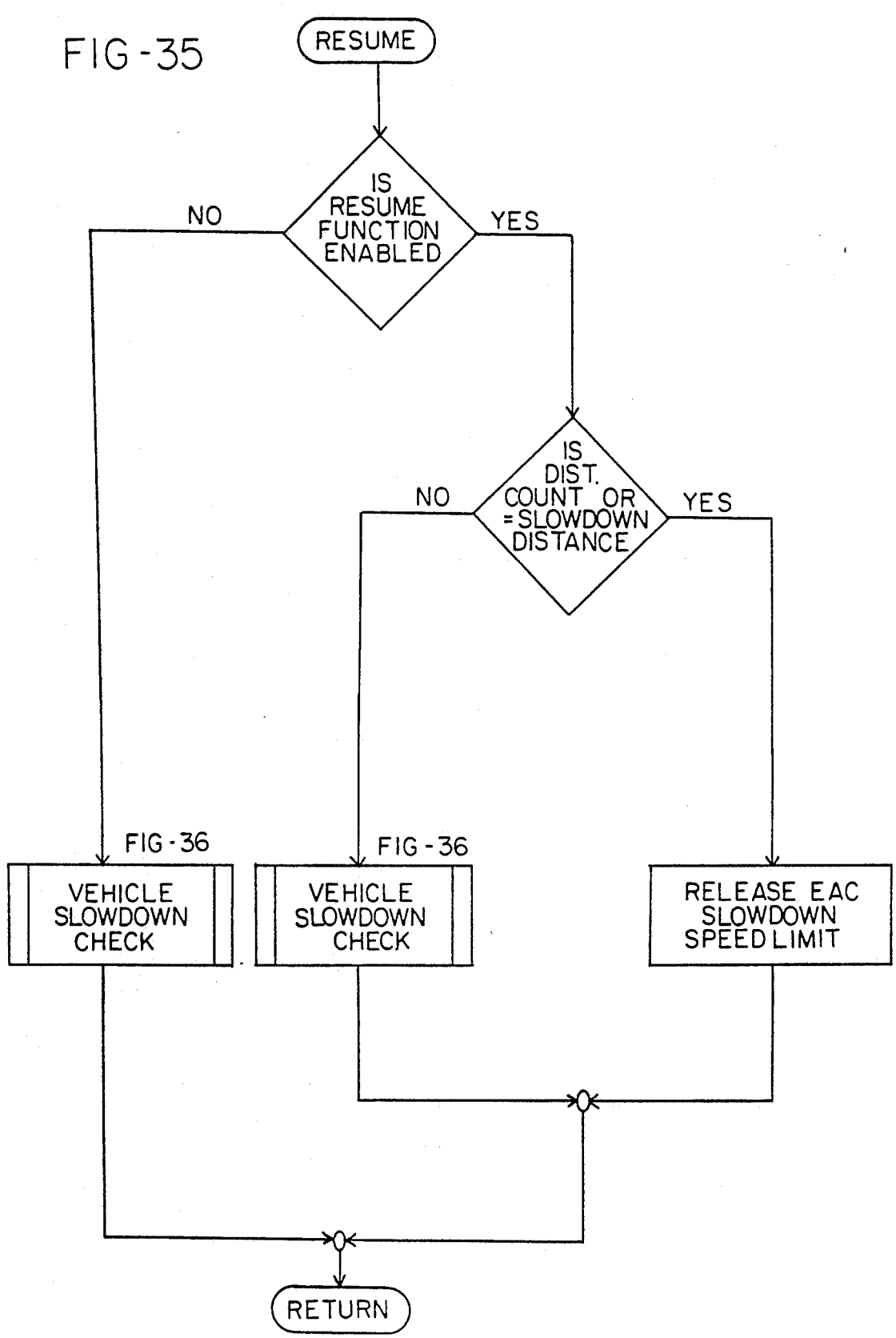

If a stop is not required, then the RESUME subroutine of FIG. 35 will be invoked. As shown in FIG. 35, the RESUME subroutine checks to see whether the resume mode has been enabled, and if it has, it determines whether the vehicle has traveled to a location in the aisle where the operator may be permitted to resume travel at the maximum permitted vehicle speed. Until the resume distance has been reached, the RESUME subroutine refers to the SLOW subroutine of FIG. 36. When the resume distance is finally reached, the slowdown speed limit will be released.

Normally, the vehicle will either be brought to a complete stop, or slowed to a predetermined speed, at each end of an aisle. In the present embodiment, both ends of the aisle are configured upon setup to have identical functions. It is possible, however, to delay operation of either the stop or the resume command at one end or to modify the resume distance by using a second B magnet.

Figure 32:
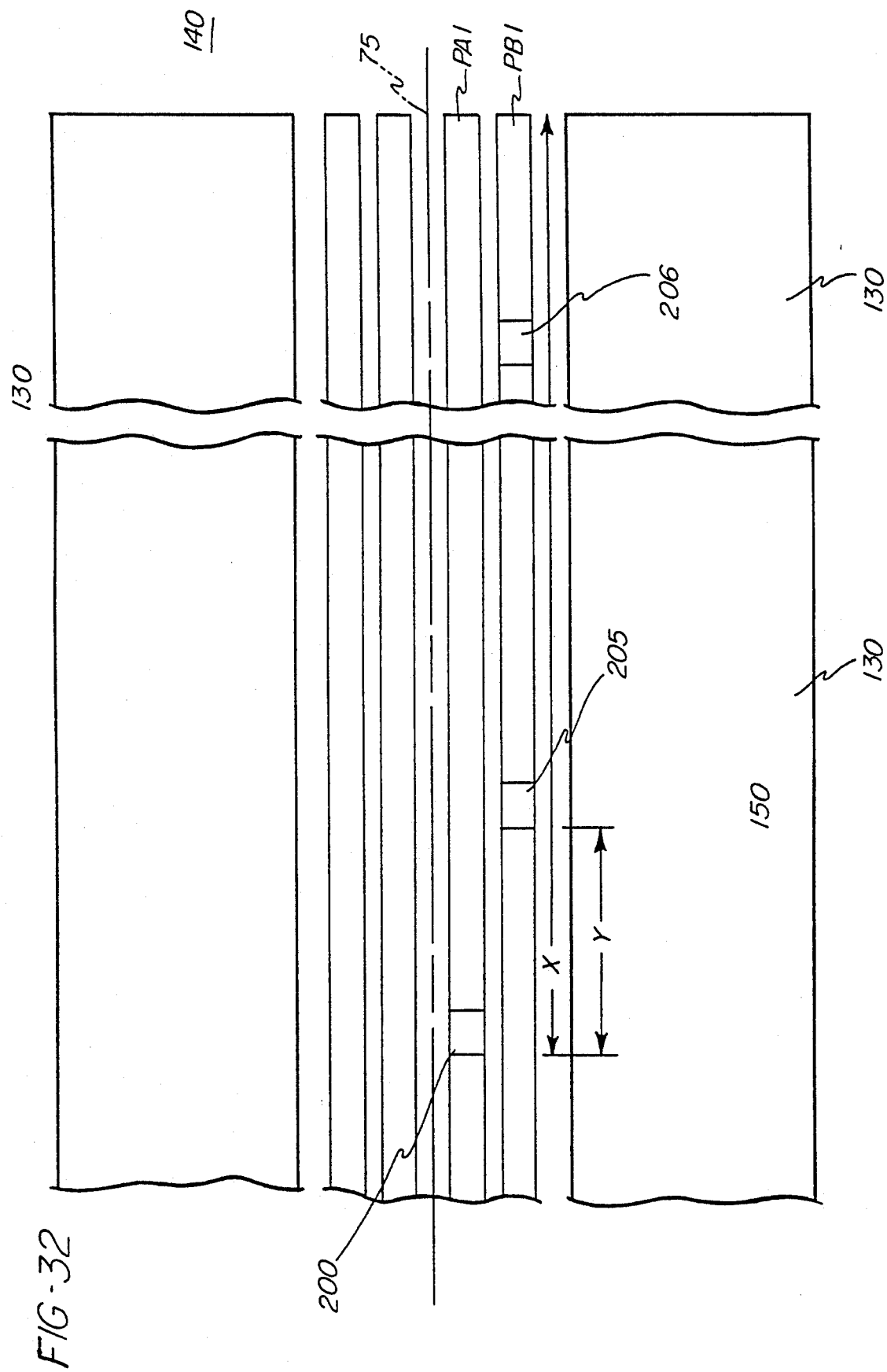
FIG. 32 is an enlarged plan view of a portion of an aisle showing an alternative embodiment of this invention where a pair of magnets are used in an end of aisle zone to provide a diagnostic capability.

If a second B magnet or magnet 206 is installed in path PB1 of FIG. 32, then it will be detected after the B Magnet Seen Flag (FIG. 33) has been set. When the second B magnet is detected, a Set Diagnostics Skip flag is set and the distance counter will be cleared. The vehicle, in the meantime, has been slowed to its preset slowdown speed. The second B magnet therefore merely resets the distance counter to push back or extend the distance the vehicle travels before executing a particular function, such as resume or stop. As shown in FIG. 33, detecting a second B magnet results in the Set Diagnostics Skip flag being set, and this will prevent a comparison of the A and B magnets in FIG. 34.

Configuration of the embodiment of FIGS. 32-36 is accomplished by the SETUP software shown in the flowchart of FIG. 37. The first decision is whether an end of aisle control (EAC) is desired. If not, then the slowdown, stop and resume modes of operation or vehicle control functions are all disabled. If end of aisle control is desired, then the slowdown speed and distance are entered into the microprocessor 18 via the service terminal 110. If it is desired to stop the vehicle at the ends of the aisle, then the stop mode is enabled and the stop distance is programmed into the microprocessor. Finally, if the resume mode is desired, it is enabled and the resume distance entered into the microprocessor.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claim.

What is claimed is:

1. A method for controlling the speed of an operator controlled materials handling vehicle comprising the steps of
   establishing a plurality of vehicle operating zones in aisles of a warehouse,
   placing position indicating devices in said aisles to identify the boundaries of each of said zones,
   setting the maximum speed of operation for the vehicle within each of said zones,
   sensing said zone boundary identifying position indicating devices, and
   setting the speed of the vehicle as the vehicle transits from one zone to another and within each of said zones based on said set maximum speed of operation.

2. The method of claim 1 further including the step of establishing a mode for braking the vehicle in response to a transit of the vehicle from one zone to another.

3. The method of claim 1 wherein the step of establishing a plurality of vehicle operating zones includes the steps of establishing an auto guided zone and an end-of-aisle zone.

4. The method of claim 3 wherein the step of establishing vehicle operating zones further includes the step of establishing an end-aisle-blocked zone.

5. The method of claim 3 wherein each of the operating zones is defined by said position indicating devices placed in separate paths in the aisle.

6. The method of claim 5 wherein the position indicating devices are magnets and wherein said magnets in adjacent separate paths are oppositely polarized.

7. The method of claim 1 further including the steps of
   selecting a mode for braking the vehicle for an end-of-aisle forward travel sensor,
   selecting a mode for braking the vehicle for an end-of-aisle reverse travel sensor, and
   selecting a mode for braking the vehicle for an end-of-aisle-blocked sensor.

8. The method of claim 2 wherein the step of establishing a mode for braking the vehicle in response to a transition of the vehicle from one zone to another includes establishing a mode of stopping or slowing the vehicle.

9. A method for establishing a maximum vehicle speed to be used in an end of aisle control system for an operator controlled materials handling vehicle comprising the steps of
   establishing auto-guided vehicle operating zones;
   locating position indicating devices in predetermined paths in the aisles for identifying the boundaries of each of said auto-guided zones;
   providing the vehicle with a plurality of position indicating device sensors located above said predetermined paths;
   establishing vehicle control functions in response to a transition of the vehicle from one zone to another, depending on the direction of travel of the vehicle, and
   establishing maximum speed limits for the vehicle within each of said zones based on said direction of travel within said zone.

10. The method of claim 9 wherein said auto-guided vehicle operating zones includes an in-aisle zone, and an end-of-aisle zone.

11. The method of claim 10 wherein said operating zones further includes an end-aisle-blocked zone.

12. The method of claim 10 further including the step of preventing the vehicle from further travel in the original direction whenever an end-aisle-blocked zone in entered.

13. The method of claim 9 wherein said vehicle control functions includes one of the following operations: plug to a predetermined speed, plug to a stop, brake to a stop, and no action.

14. The method of claim 9 further including identifying a location between adjacent end-of-aisle zones for indicating that the vehicle resumes operating according to an in-aisle zone speed prior to entering the beginning of an in-aisle zone.

15. The method of claim 14 wherein the step of identifying a location includes a step of placing a position indicating device in a predetermined path between said adjacent end of aisle zones.

16. The method of claim 9 wherein the step of establishing the vehicle control functions requires the vehicle to come to a complete stop, and further including a step of providing the operator with a visual signal indicating that a manual release switch must be activated before the vehicle can continue travel.

17. The method of claim 9 wherein the steps of establishing vehicle control functions and maximum speed limits are done by a service terminal temporarily connected to said vehicle.

18. A method of controlling the operating characteristics of an operator controlled materials handling vehicle in an aisle, the method comprising the steps of
   establishing an end aisle zone by reference to an end aisle position indicating device placed in the aisle,
   establishing the speed of the vehicle while in the end aisle zone,
   establishing a stopping distance for the vehicle at the speed established in the end aisle zone, and
   initiating the braking of the vehicle to a stop upon the vehicle reaching said stopping distance.

19. The method of claim 18 wherein the stopping distance is calculated by reference to the distance traveled by the vehicle after passing a predetermined known position.

20. The method of claim 18 wherein the stopping distance is calculated from said end aisle position indicating device.

21. The method of claim 18 wherein the stopping distance is indicated by an end aisle stop position indicating device installed in the aisle.

22. An end of aisle control apparatus for use on an operator controlled materials handling vehicle including
   means for sensing floor mounted magnets in each of a plurality of paths identifying predetermined vehicle operating zones,
   means for sensing and controlling the speed and direction of vehicle travel,
   means responsive to said magnet sensing means for controlling the maximum speed of the vehicle based on the sensed direction of vehicle travel in each of said operating zones, and
   means responsive to said magnet sensing means for controlling the slowing of the vehicle as it transits from a higher speed zone to a lower speed zone.

23. The apparatus of claim 22 wherein said means for controlling the slowing of the vehicle includes means for controlling the mechanical brakes of said vehicle.

24. The apparatus of claim 22 wherein said means for controlling the slowing of the vehicle includes means for plugging the traction motors powering the vehicle.

25. The apparatus of claim 22 wherein said means for controlling the slowing of the vehicle includes means for bring the vehicle to a complete stop, said means for controlling further including means for releasing the vehicle from a stopped condition and means for visually indicating that actuation of said releasing means is required.

26. A method of controlling the operation of a operator controlled materials handling vehicle as it approaches an end of an aisle, the method comprising the steps of
   placing first and second position indicating devices in the aisle, the position indicating devices being spaced apart a first predetermined distance in the direction of movement of the vehicle,
   providing separate first and second position indicating device sensors on the vehicle for detecting the passage of the vehicle over the first and second position indicating devices, respectively,
   monitoring the distance the vehicle travels after passing at least one of the position indicating devices,
   limiting the speed of the vehicle a second predetermined distance in the direction of the vehicle travel toward the nearest aisle end after detecting the presence of at least one of said position indicating devices, and
   stopping the vehicle if the second position indicating device has not been detected within a predetermined distance after the detection of the first position indicating device.

27. The method of claim 26 further including the steps of
   sensing the speed of the vehicle when at least one of said position indicating devices is detected,
   sensing the speed of the vehicle a predetermined distance after detection of one of said position indicating devices, and
   stopping the vehicle if the speed at the predetermined distance is greater than a predetermined percentage of its previous speed.

28. The method of claim 26 further including the step of performing a vehicle control function a third predetermined distance after detecting the presence of at least one of said position indicating devices.

29. The method of claim 28 wherein said vehicle control function includes the step of stopping the vehicle a predetermined distance after detecting the presence of one of said position indicating devices.

30. The method of claim 28 wherein said vehicle control function includes the step of permitting the vehicle to resume operating at it maximum permitted speed after traveling a predetermined distance.

31. The method of claim 28 further including the steps of
   providing an additional position indicating device prior to the end of the aisle;
   detecting the presence of said additional position indicating device; and
   setting the monitored distance traveled to zero thereby to delay the operation of the vehicle control function.

32. A method of controlling the operation of a operator controlled materials handling vehicle as it approaches an end of an aisle, the method comprising the steps of placing at least one position indicating device in the aisle, providing at least one position indicating device sensor on the vehicle for detecting the passage of the vehicle over said position indicating device, monitoring the distance the vehicle travels after passing said position indicating device, and performing at least one vehicle control function in response to the vehicle travelling a predetermined distance in the direction of the vehicle travel toward the nearest aisle end after detecting the presence of said position indicating device, wherein said vehicle control function includes the step of slowing the vehicle to a predetermined maximum speed and further including the step of stopping the vehicle if its speed, after it has travelled a second predetermined distance from the detection of said position indicating device, is greater than a specified percentage of the speed of the vehicle when it first detected said position indicating device.

33. The method of claim 32 wherein said vehicle is slowed immediately upon detecting said position indicating device.

34. The method of claim 32 wherein said vehicle is slowed a predetermined distance after detecting said position indicating device.

35. The method of claim 32 wherein said vehicle control function further includes the step of stopping the vehicle after it has traveled a predetermined distance.

36. The method of claim 32 wherein said vehicle control function further includes the step of permitting the vehicle to resume its maximum operating speed after it has traveled a predetermined distance.

37. A method of controlling the operation of a operator controlled materials handling vehicle as it approaches an end of an aisle, the method comprising the steps of placing at least one position indicating device in the aisle, providing at least one position indicating device sensor on the vehicle for detecting the passage of the vehicle over said position indicating device, monitoring the distance the vehicle travels after passing said position indicating device, and performing at least one vehicle control function in response to the vehicle travelling a predetermined distance in the direction of the vehicle travel toward the nearest aisle end after detecting the presence of said position indicating device, and providing a second position indicating device and stopping the vehicle if said second position indicating device has not been detected within a predetermined distance after the detection of the first position indicating device.

* * * * *